US009668011B2

(12) United States Patent
D'Luna et al.

(10) Patent No.: US 9,668,011 B2
(45) Date of Patent: May 30, 2017

(54) SINGLE CHIP SET-TOP BOX SYSTEM

(75) Inventors: Lionel D'Luna, Irvine, CA (US); Francis Cheung, Del Mar, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1975 days.

(21) Appl. No.: 09/969,212

(22) Filed: Oct. 2, 2001

(65) Prior Publication Data
US 2002/0106018 A1    Aug. 8, 2002

Related U.S. Application Data

(60) Provisional application No. 60/266,753, filed on Feb. 5, 2001.

(51) Int. Cl.
*H04N 21/426* (2011.01)
*G06T 9/00* (2006.01)
(Continued)

(52) U.S. Cl.
CPC ........... *H04N 21/426* (2013.01); *G06T 9/007* (2013.01); *G09G 5/14* (2013.01); *G09G 5/36* (2013.01); *H04B 1/66* (2013.01); *H04N 5/4401* (2013.01); *H04N 5/44504* (2013.01); *H04N 9/641* (2013.01); *H04N 21/42615* (2013.01);
(Continued)

(58) Field of Classification Search
CPC .. G06T 9/007; H04N 21/8146; H04N 5/4401; H04N 5/44504; H04N 5/602; H04N 9/641; H04N 21/426; H04N 21/42615; H04N 21/434; H04N 21/435; H04N 21/4381; G09G 5/12; G09G 5/14; G09G 5/28; G09G 5/346; G09G 5/36; G09G 2310/0224; G09G 2340/0407; G09G 2340/10;
(Continued)

(56) References Cited

U.S. PATENT DOCUMENTS 4,020,332 A    4/1977    Crochiere et al.
4,367,466 A    1/1983    Takeda et al.
(Continued)

FOREIGN PATENT DOCUMENTS

EP    0746116 A2    12/1996
EP    0 752 695    1/1997
(Continued)

OTHER PUBLICATIONS

D'Luna, L. et al., "A Single-Chip Universal Cable Set-Top Box/Modem Transceiver," IEEE Journal of Solid State Circuits, vol. 34, No. 11, pp. 1647-1660, Nov. 1999.
(Continued)

*Primary Examiner* — Chenea Smith
(74) *Attorney, Agent, or Firm* — Foley & Lardner LLP

(57) ABSTRACT

A single chip set-top box system and method is provided. The system comprises, for example, a transceiver, an audio/video decoder, a CPU, peripherals, DAVIC MAC and a graphics processor. The transceiver receives a digitally modulated compressed audio/video signal, and the audio/video decoder receives the compressed audio/video signal from the transceiver and decompresses the compressed audio/video signal. The graphics processor blends the decompressed audio/video signal with graphics to generate a blended video image with audio.

89 Claims, 21 Drawing Sheets

(51) Int. Cl.

| | | |
|---|---|---|
| G09G 5/14 | (2006.01) | |
| G09G 5/36 | (2006.01) | |
| H04B 1/66 | (2006.01) | |
| H04N 5/44 | (2011.01) | |
| H04N 5/445 | (2011.01) | |
| H04N 9/64 | (2006.01) | |
| H04N 21/434 | (2011.01) | |
| H04N 21/435 | (2011.01) | |
| H04N 21/438 | (2011.01) | |
| H04N 21/81 | (2011.01) | |
| G09G 5/06 | (2006.01) | |
| G09G 5/12 | (2006.01) | |
| G09G 5/28 | (2006.01) | |
| G09G 5/34 | (2006.01) | |
| H04N 5/60 | (2006.01) | |

(52) U.S. Cl.
CPC ......... *H04N 21/434* (2013.01); *H04N 21/435* (2013.01); *H04N 21/4381* (2013.01); *H04N 21/8146* (2013.01); *G09G 5/06* (2013.01); *G09G 5/12* (2013.01); *G09G 5/28* (2013.01); *G09G 5/346* (2013.01); *G09G 2310/0224* (2013.01); *G09G 2340/0407* (2013.01); *G09G 2340/10* (2013.01); *G09G 2340/125* (2013.01); *G09G 2360/125* (2013.01); *H04N 5/602* (2013.01)

(58) Field of Classification Search
CPC ....... G09G 2340/125; G09G 2360/125; G09G 5/06; H04B 1/66
USPC .......................................................... 725/131
See application file for complete search history.

(56) References Cited

U.S. PATENT DOCUMENTS

| | | | |
|---|---|---|---|
| 4,532,547 A | | 7/1985 | Bennett |
| 4,679,040 A | | 7/1987 | Yan |
| 4,688,033 A | | 8/1987 | Carini et al. |
| 4,954,970 A | | 9/1990 | Walker et al. |
| 4,959,718 A | | 9/1990 | Bennett |
| 4,967,392 A | | 10/1990 | Werner et al. |
| 5,043,714 A | | 8/1991 | Perlman |
| 5,065,230 A | * | 11/1991 | Kumano et al. ............... 348/582 |
| 5,097,257 A | | 3/1992 | Clough et al. |
| 5,142,273 A | | 8/1992 | Wobermin |
| 5,155,816 A | | 10/1992 | Kohn |
| 5,206,722 A | * | 4/1993 | Kwan ........................... 725/100 |
| 5,258,747 A | | 11/1993 | Oda et al. |
| 5,262,854 A | | 11/1993 | Ng |
| 5,307,177 A | | 4/1994 | Shibata et al. |
| 5,321,750 A | * | 6/1994 | Nadan ........................... 380/230 |
| 5,384,912 A | | 1/1995 | Ogrinc et al. |
| 5,387,927 A | * | 2/1995 | Look et al. ................... 725/114 |
| 5,396,567 A | | 3/1995 | Jass |
| 5,398,211 A | | 3/1995 | Willenz et al. |
| 5,404,447 A | | 4/1995 | Drako et al. |
| 5,418,535 A | | 5/1995 | Masucci et al. |
| 5,432,900 A | | 7/1995 | Rhodes et al. |
| 5,434,683 A | | 7/1995 | Sekine et al. |
| 5,434,957 A | | 7/1995 | Moller |
| 5,467,144 A | | 11/1995 | Saeger et al. |
| 5,471,411 A | | 11/1995 | Adams et al. |
| 5,481,296 A | * | 1/1996 | Cragun et al. ................ 725/136 |
| 5,515,077 A | | 5/1996 | Tateyama |
| 5,526,054 A | | 6/1996 | Greenfield et al. |
| 5,533,182 A | | 7/1996 | Bates et al. |
| 5,546,103 A | | 8/1996 | Rhodes et al. |
| 5,550,594 A | | 8/1996 | Cooper et al. |
| 5,570,296 A | | 10/1996 | Heyl et al. |
| 5,577,187 A | | 11/1996 | Mariani |
| 5,600,364 A | | 2/1997 | Hendricks et al. |
| 5,604,514 A | | 2/1997 | Hancock |
| 5,614,952 A | | 3/1997 | Boyce et al. |
| 5,615,376 A | | 3/1997 | Ranganathan |
| 5,619,337 A | | 4/1997 | Naimpally |
| 5,621,869 A | | 4/1997 | Drews |
| 5,621,906 A | | 4/1997 | O'Neill et al. |
| 5,625,611 A | | 4/1997 | Yokota et al. |
| 5,625,764 A | | 4/1997 | Tsujimoto et al. |
| 5,635,985 A | | 6/1997 | Boyce et al. |
| 5,638,501 A | | 6/1997 | Gough et al. |
| 5,640,543 A | | 6/1997 | Farrell et al. |
| 5,664,162 A | | 9/1997 | Dye |
| 5,694,143 A | | 12/1997 | Fielder et al. |
| 5,696,527 A | | 12/1997 | King et al. |
| 5,706,478 A | | 1/1998 | Dye |
| 5,708,764 A | | 1/1998 | Borrel et al. |
| 5,719,593 A | | 2/1998 | De Lange |
| 5,727,084 A | | 3/1998 | Pan et al. |
| 5,742,779 A | | 4/1998 | Steele et al. |
| 5,745,095 A | | 4/1998 | Parchem et al. |
| 5,748,983 A | | 5/1998 | Gulick et al. |
| 5,751,979 A | | 5/1998 | McCrory |
| 5,754,185 A | | 5/1998 | Hsiao et al. |
| 5,757,377 A | | 5/1998 | Lee et al. |
| 5,758,177 A | | 5/1998 | Gulick et al. |
| 5,761,516 A | | 6/1998 | Rostoker et al. |
| 5,764,238 A | | 6/1998 | Lum et al. |
| 5,790,136 A | | 8/1998 | Hoffert et al. |
| 5,790,795 A | | 8/1998 | Hough |
| 5,790,842 A | | 8/1998 | Charles et al. |
| 5,793,445 A | | 8/1998 | Lum et al. |
| 5,802,063 A | | 9/1998 | Deiss |
| 5,815,137 A | | 9/1998 | Weatherford et al. |
| 5,822,676 A | * | 10/1998 | Hayashi et al. .............. 725/114 |
| 5,828,383 A | | 10/1998 | May et al. |
| 5,831,615 A | | 11/1998 | Drews et al. |
| 5,844,608 A | | 12/1998 | Yu et al. |
| 5,848,367 A | * | 12/1998 | Lotocky et al. ................ 701/36 |
| 5,856,975 A | * | 1/1999 | Rostoker et al. ......... 370/395.64 |
| 5,864,345 A | | 1/1999 | Wickstrom et al. |
| 5,867,166 A | | 2/1999 | Myhrvold et al. |
| 5,870,087 A | * | 2/1999 | Chau ............................. 715/202 |
| 5,870,622 A | | 2/1999 | Gulick et al. |
| 5,874,967 A | | 2/1999 | West et al. |
| 5,894,300 A | | 4/1999 | Takizawa |
| 5,912,710 A | * | 6/1999 | Fujimoto ....................... 348/445 |
| 5,914,728 A | | 6/1999 | Yamagishi et al. |
| 5,920,572 A | | 7/1999 | Washington et al. |
| 5,920,682 A | | 7/1999 | Shu et al. |
| 5,923,316 A | | 7/1999 | Kitamura et al. |
| 5,923,385 A | | 7/1999 | Mills et al. |
| 5,926,647 A | | 7/1999 | Adams et al. |
| 5,940,089 A | | 8/1999 | Dilliplane et al. |
| 5,941,968 A | | 8/1999 | Mergard et al. |
| 5,949,432 A | | 9/1999 | Gough et al. |
| 5,949,439 A | | 9/1999 | Ben-Yoseph et al. |
| 5,951,664 A | | 9/1999 | Lambrecht et al. |
| 5,956,041 A | | 9/1999 | Koyamada et al. |
| 5,959,626 A | | 9/1999 | Garrison et al. |
| 5,959,637 A | | 9/1999 | Mills et al. |
| 5,960,464 A | | 9/1999 | Lam |
| 5,963,201 A | | 10/1999 | McGreggor et al. |
| 5,963,262 A | | 10/1999 | Ke et al. |
| 5,977,933 A | | 11/1999 | Wicher et al. |
| 5,977,997 A | * | 11/1999 | Vainsencher ................. 345/519 |
| 5,978,509 A | | 11/1999 | Nachtergaele et al. |
| 5,982,381 A | | 11/1999 | Joshi et al. |
| 5,982,459 A | | 11/1999 | Fandrianto et al. |
| 5,987,555 A | | 11/1999 | Alzien et al. |
| 6,002,411 A | | 12/1999 | Dye |
| 6,002,882 A | | 12/1999 | Garde |
| 6,005,546 A | | 12/1999 | Keene |
| 6,006,303 A | | 12/1999 | Barnaby et al. |
| 6,011,548 A | * | 1/2000 | Thacker ......................... 725/105 |
| 6,014,694 A | * | 1/2000 | Aharoni et al. ............... 709/219 |
| 6,018,803 A | | 1/2000 | Kardach |
| 6,023,302 A | | 2/2000 | MacInnis et al. |
| 6,023,738 A | | 2/2000 | Priem et al. |
| 6,028,583 A | | 2/2000 | Hamburg |

(56) References Cited

U.S. PATENT DOCUMENTS

| | | | |
|---|---|---|---|
| 6,038,031 A | 3/2000 | Murphy | |
| 6,046,740 A | 4/2000 | LaRoche et al. | |
| 6,064,676 A | 5/2000 | Slattery et al. | |
| 6,078,305 A | 6/2000 | Mizutani | |
| 6,081,854 A | 6/2000 | Priem et al. | |
| 6,088,046 A | 7/2000 | Larson et al. | |
| 6,088,355 A | 7/2000 | Mills et al. | |
| 6,092,124 A | 7/2000 | Priem et al. | |
| 6,094,226 A | 7/2000 | Ke et al. | |
| 6,098,046 A | 8/2000 | Cooper et al. | |
| 6,100,826 A | 8/2000 | Jeon et al. | |
| 6,100,899 A * | 8/2000 | Ameline et al. | 345/605 |
| 6,105,048 A | 8/2000 | He | |
| 6,108,014 A | 8/2000 | Dye | |
| 6,111,882 A * | 8/2000 | Yamamoto | 370/399 |
| 6,111,896 A | 8/2000 | Slattery et al. | |
| 6,121,978 A | 9/2000 | Miler | |
| 6,124,865 A | 9/2000 | Meinerth et al. | |
| 6,125,410 A | 9/2000 | Salbaum et al. | |
| 6,133,901 A | 10/2000 | Law | |
| 6,151,030 A | 11/2000 | DeLeeuw et al. | |
| 6,151,074 A | 11/2000 | Werner | |
| 6,157,415 A | 12/2000 | Glen | |
| 6,157,978 A | 12/2000 | Ng et al. | |
| 6,160,989 A | 12/2000 | Hendricks et al. | |
| 6,167,498 A | 12/2000 | Larson et al. | |
| 6,169,843 B1 | 1/2001 | Lenihan et al. | |
| 6,184,908 B1 | 2/2001 | Chan et al. | |
| 6,189,064 B1 | 2/2001 | MacInnis et al. | |
| 6,199,131 B1 | 3/2001 | Melo et al. | |
| 6,204,859 B1 | 3/2001 | Jouppi et al. | |
| 6,205,260 B1 | 3/2001 | Crinon et al. | |
| 6,208,354 B1 | 3/2001 | Porter | |
| 6,212,590 B1 | 4/2001 | Melo et al. | |
| 6,229,550 B1 | 5/2001 | Gloudemans et al. | |
| 6,239,810 B1 | 5/2001 | Van Hook et al. | |
| 6,252,608 B1 | 6/2001 | Snyder et al. | |
| 6,263,019 B1 | 7/2001 | Ryan | |
| 6,263,396 B1 * | 7/2001 | Cottle et al. | 710/263 |
| 6,266,072 B1 | 7/2001 | Koga et al. | |
| 6,266,753 B1 | 7/2001 | Hicok et al. | |
| 6,269,107 B1 | 7/2001 | Jong | |
| 6,271,826 B1 | 8/2001 | Pol et al. | |
| 6,311,204 B1 | 10/2001 | Mills | |
| 6,320,619 B1 | 11/2001 | Jiang | |
| 6,326,984 B1 | 12/2001 | Chow et al. | |
| 6,327,000 B1 | 12/2001 | Auld et al. | |
| 6,335,746 B1 | 1/2002 | Enokida et al. | |
| 6,337,703 B1 | 1/2002 | Konar et al. | |
| 6,342,892 B1 | 1/2002 | Van Hook et al. | |
| 6,351,471 B1 | 2/2002 | Robinett et al. | |
| 6,351,474 B1 | 2/2002 | Robinett et al. | |
| 6,362,827 B1 | 3/2002 | Ohba | |
| 6,380,945 B1 | 4/2002 | MacInnis et al. | |
| 6,411,333 B1 | 6/2002 | Auld et al. | |
| 6,526,583 B1 * | 2/2003 | Auld et al. | 725/139 |
| 6,573,905 B1 | 6/2003 | MacInnis et al. | |
| 6,631,522 B1 * | 10/2003 | Erdelyi | 725/53 |
| 6,647,069 B1 * | 11/2003 | Segal et al. | 375/278 |
| 6,700,588 B1 | 3/2004 | MacInnis et al. | |
| 6,785,902 B1 * | 8/2004 | Zigmond et al. | 725/38 |
| 6,865,746 B1 * | 3/2005 | Herrington et al. | 725/53 |
| 6,961,430 B1 * | 11/2005 | Gaske et al. | 380/216 |
| 7,039,245 B1 * | 5/2006 | Hamery | 382/232 |
| 7,200,859 B1 * | 4/2007 | Perlman et al. | 725/133 |
| 7,365,757 B1 * | 4/2008 | Callway et al. | 345/629 |
| 2002/0029284 A1 * | 3/2002 | Agarwal et al. | 709/231 |
| 2002/0107909 A1 * | 8/2002 | Eyer et al. | 709/203 |
| 2005/0071882 A1 * | 3/2005 | Rodriguez et al. | 725/95 |
| 2005/0160452 A1 * | 7/2005 | Lawler et al. | 725/38 |

FOREIGN PATENT DOCUMENTS

| | | |
|---|---|---|
| EP | 0 840 505 | 5/1998 |
| EP | 0840276 A2 | 5/1998 |
| EP | 0840277 A2 | 5/1998 |
| EP | 0840512 A | 5/1998 |
| EP | 0880277 A | 11/1998 |
| GB | 2287627 A | 3/1995 |
| WO | WO 94/10641 | 5/1994 |
| WO | WO 96/06504 A | 2/1996 |
| WO | WO 97/20281 A | 6/1997 |
| WO | WO 00/28518 | 5/2000 |
| WO | WO 00/55970 A | 9/2000 |
| WO | WO-01/74079 A | 10/2001 |

OTHER PUBLICATIONS

Digital Audio-Visual Council, DAVIC 1.2 Specification Part 8, Lower Layer Protocols and Physical Interfaces, Rev. 4.2, 1997.

ETSI ETR 289: "Digital Video Broadcasting (DVB); Support for use of scrambling and Conditional Access (CA) within digital broadcasting systems," Oct. 1996.

Plaintiff and Counterdefendant Qualcomm Incorporated's Preliminary Invalidity Contentions for U.S. Pat. Nos. 6,501,480 and 6,570,579.

Thomas Porter & Tom Duff, "Compositing Digital Images", Computer Graphics, vol. 18, No. 3, Jul. 1984, pp. 253-259.

Akeley, K. & Jermoluk T., "High-Performance Polygon Rendering," 22 Computer Graphics No. 4 (ACM Aug. 1988).

Apgar, B., et al., "A Display System for the Stellar Graphics Superconductor Model GS1000," 22 Computer Graphics No. 4 (ACM Aug. 1988).

Asal, M.D., et al., "Novel Architecture for a High Performance Full Custom Graphics Processor," (IEEE 1989).

Awaga, M., et al., "3D Graphics Processor Chip Set," (IEEE Dec. 1995).

Cox, M. & Bhandari, N., "Architectural Implications of Hardware-Accelerated Bucket Rendering on the PC," (Association for Computing Machinery SIGGRAPH/Eurographics Workshop 1997).

Cyrix Corporation Manual, copyrighted 1996, 1997, and all underlying development work.

Deering, M., et al., "The Triangle Processor and Normal Vector Shader: A VLSI System for High Performance Graphics," 22 Computer Graphics No. 4 (ACM Aug. 1998).

Donovan, W., et al., "Pixel Processing in a Memory Controller," (IEEE Computer Graphics and Applications 1995).

Dutton, T., "The Design of the DEC 3000 Model 500 AXP Workstation," (IEEE 1993).

Foley, James, D., et al., "Introduction to Computer Graphics," (Addison-Wesley Publishing Co. 1994) ("Introduction to Computer Graphics").

Galbi, D., et al., "An MPEG-1 Audio/Video Decoder with Run-Length Compressed Antialiased Video Overlays," (1995 IEEE International Solid-State Circuits Conference).

Glaskowsky, Peter, "Cyrix Creates Ultimate CPU for Games," Microprocessor Report, Dec. 8, 1997.

Glaskowsky, Peter, "Intel Displays 740 Graphics Chip: Auburn Sets New Standard for Quality—But Not Speed," Microprocessor Report No. 2, Feb. 16, 1998.

Gwennap, L., "Verite: A Programmable 3D Chip: Rendition Uses Internal RISC CPU for Versatility, Performance," 10 Microprocessor Report No. 6, May 6, 1996.

Hosotani S., et al., "A Display Processor Conforming to all DTV Formats with 188-TAP FIR Filters and 284 Kb FIFO Memories," (IEEE 1997 (Manuscript received Jun. 13, 1997)).

Knittel, G. & Straber, W., "VIZARD—Visualization Accelerator for Realtime Display," (Association for Computing Machinery SIGGRAPH/Eurographics Workshop 1997).

Lewis, R., et al., "Delivering PCI in HP B-Class and C-Class Workstations: A Case Study in the Challenges of Interfacing with Industry Standards," (Hewlett-Packard Journal May 1998).

Manepally, R. & Sprague, D., "Intel's i750 (R) Video Processor—The Programmable Solution," (IEEE 1991).

McCormack, J., et al., "Neon: A Single-Chip 3D Workstation Graphics Accelerator," (SIGGRAPH Eurograph Workshop Graph Hardware Aug. 31-Sep. 1, 1998).

(56) References Cited

OTHER PUBLICATIONS

Norrod, F. & Wawrzynak, R., "A Multimedia-Enhanced x88 Processor, Digest of Technical Papers," ISSCC96 (Feb. 9, 1996).
Oguchi, T., et al., "A Single-Chip Graphic Display Controller," (1981 IEEE International Solid-State Circuits Conference).
Soferman, Z., et al., "Advanced Graphics Behind Medical Virtual Reality: Evolution of Algorithms, Hardware, and Software Interfaces," 86 Proceedings of the IEEE No. 3 (IEEE Mar. 1998 (Manuscript received Jul. 3, 1997)).
Scott, N., et al., "An Overview of the VISUALIZE fx Graphics Accelerator Hardware," (Hewlett-Packard Journal May 1998) and all underlying development work ("HP").
Sumi, M., et al., "A 40-Mpixel/s Bit Block Transfer Graphics Processor," (IEEE 1989).
Foley, James D., et al.; Computer Graphics: Principles and Practice; publication, 1996, 1990; The Systems Programming Series, 4 pages, Second Edition in C; Addison-Wesley Publishing Company, U.S.A.
Tobias, R., "The LR33020 GraphX Processor: A Single Chip X-Terminal Controller," (IEEE 1992).
Watkins, J., et al., A Memory Controller with an Integrated Graphics Processor (IEEE 1993).
Yao, Yong, "Samsung Launches Media Processor: MSP Is Designed for Microsoft's New 3D-Software Architecture," 10 Microprocessor Report No. 11, Aug. 26, 1996.
Yao, Yong, "Competition Heats Up in 3D Accelerators: Market Hungers for a Unified Multimedia Platform from Microsoft," 10 Microprocessor Report No. 15, Nov. 18, 1996.
Yao, Yong, "Chromatic's Mpact 2 Boosts 3D: Mpact/3000 Becomes First Media Processor to Ship in Volume," 10 Microprocessor Report No. 15, Nov. 18, 1996.
Motorola, Inc. MC92100 "Scorpion" Graphics Display Generator, SDRAM Controller, and Digital Video Encoder, 1997, 6 pages.
Power TV, Inc., Eagle™ Graphics/Audio Media Compositor Data Sheet, Version 1.7, Feb. 27, 1997, pp. 63.
Berekovic, M. & Pirsch, P., "Architecture of a Coprocessor Module for Image Compositing," (IEEE 1998).
Blinn, J., "Compositing, Part I: Theory," (IEEE Sep. 1994).
Blinn, Jim; Jim Blinn's Corner Dirty Pixels; publication; 1998; pp. 179-190; Chapter Sixteen; Morgan Kaufmann Publishers, Inc.; San Francisco, CA, U.S.A.
Jaspers, et al., "A Flexible Heterogeneous Video Processor System for Television Applications," (IEEE Sep. 25, 1998).
Li, R., et al., "A Flexible Display Module for DVD and Set-Top Box Applications," (IEEE Transactions on Consumer Electronics Aug. 1997 (Manuscript received Jun. 13, 1997)).
Ostermann, J., "Coding of Arbitrarily Shaped Objects with Binary and Greyscale Alpha-Maps: What Can MPEG-4 Do for You?," (Proceedings of the 1998 IEEE International Symposium on Circuits and Systems, May 31-Jun. 3, 1998, vol. 5).
Stytz, et al., "Three-Dimensional Medical Imaging: Algorithms and Computer Systems," (ACM Computing Surveys, Dec. 1991).
Wang, J. & Adelson, E., "Representing Moving Images with Layers," (IEEE Transactions on Image Processing, Sep. 1994).
Sun, Huifang et al., "A New Approach for Memory Efficient an Decoding," 1997 IEEE International Conference on Consumer Electronics, pp. 174-175, Los Angeles, 1997.
Bao, Jay et al., "HDTV Down-Conversion Decoder," IEEE Transactions on Consumer Electronics, pp. 402-410, vol. 42, No. 3, Aug. 1996.
Mokry, Robert et al., "Minimal Error Drift in Frequency Scalability for Motion-Compensated DCT Coding," IEEE Transactions on Circuits and Systems for Video Technology, pp. 392-406, vol. 4, No. 4, Aug. 1994.
Vetro, Anthony et al., "Minium Drift Architectures for 3-Layer Scalable DTV Decoding," IEEE Transactions on Consumer Electronics, pp. 527-536, vol. 44, No. 3, Aug. 1998.
Lee, Dong-Ho et al., "HDTV Video Decoder Which Can Be Implemented With Low Complexity," IEEE International Conference on Consumer Electronics, pp. 6-7, 1994.
Sun, Huifang, "Hierarchical Decoder for MPEG Compressed Video Data," IEEE Transactions for Consumer Electronics, pp. 559-564, vol. 39, No. 3, Aug. 1993.
Yu, Haoping et al., "Block-Based Image Processor for Memory Efficient MPEG Video Decoding," 1999 IEEE International Conference on Consumer Electronics, pp. 114-115, 1999.
Marcus Levy, "Get Set for Set-Top Boxes: Finally a Reality", EDN, 'Online! , Feb. 18, 1999, XP002311524.
Gass W, "Architecture Trends of MPEG Decoders for Set-Top Box", Proceedings of the SPIE, SPIE, Bellingham, VA, US, vol. 3021, Feb. 17, 1997, pp. 162-169, XP000648211, ISSN: 0277-786X.
D'Luna et al, "A Universal Cable Set-Top Box System on a Chip", 2001 IEEE International Solid-State Circuits Conference, Feb. 5, 2001, pp. 328-461, XP010536288.
Droitcourt J L, "Understanding How Interactive Television Set Top Box Works . . . and What It Will Mean to the Customer", International Broadcasting Convention, London, GB, vol. 413, Sep. 14, 1995, pp. 382-394, XP000562377.
Cambridge Telcom Report, "Broadcom Delivers World's First Single Chip for Cable-TV Set-Top Boxes; Pioneer and Pace Adopt Broadcom's Breakthrough Technology for Time Warner Applications-Broadcom BCM7100—Product Announcement", 'Online!, May 15, 2000, Xpoo231153.
C-CUBE, "C-CUBE, AViA-9600 Family Single-Chip Digital Set-Top Box Solution", C-CUBE, Jan. 25, 2001, XP002253310.

\* cited by examiner

Receiver Enhancements

| Feature | Enhancement | Benefit |
|---|---|---|
| Equalizer span | 8 FFE taps | BER |
| Datapath precision | 4-8 bits | Lower steady state tap noise |
| Adaptation step sizes | Finer granularity | Lower steady state tap noise |
| Main tap control | Independent | Flexible |
| Image/ACI rejection filters | Finer bandwidth granularity | Slicer SNR |
| NTSC co-channel rejection | CSO/CTB rejection filters | Slicer SNR |

FIG. 4

SINGLE CHIP SET-TOP BOX SYSTEM

CROSS REFERENCE TO RELATED APPLICATIONS

This application is related to, and claims benefit of and priority from, Provisional Application No. 60/266,753 filed Feb. 5, 2001, titled "SINGLE CHIP SET-TOP BOX SYSTEM", the complete subject matter of which is incorporated herein by reference in its entirety.

FEDERALLY SPONSORED RESEARCH OR DEVELOPMENT

[Not Applicable]

BACKGROUND OF THE INVENTION

One embodiment of the present invention relates generally to integrated circuits and systems, and more particularly to a set-top box system integrated on a single integrated circuit (IC) chip.

Conventional set-top boxes generally include a number of discrete and separate components. For example, a typical set-top box may include a transceiver, an MPEG-2 audio/ video decoder, a graphics and video encoder and an analog video decoder implemented on separate integrated circuit (hereinafter referred to as "IC") chips or systems. Integrating the functionality of these components on a single IC chip, reduces fabrication time, fabrication cost and maintenance cost.

Therefore, it is desirable to provide a set-top box on a single IC chip. It is further desirable to have the single IC chip set-top box perform multiple functions.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

In one embodiment of the present invention, a single chip set-top box system is provided. The single chip set-top box system includes a transceiver, a video decoder and a graphics processor. The transceiver is used to receive a compressed video signal. The video decoder is used to receive the compressed video signal from the transceiver and decompress it. The graphics processor is used to blend the decompressed video signal with graphics to generate a blended video image.

One embodiment of the present invention provides a single chip set-top box system including a transceiver, a video decoder and a graphics processor. The transceiver receives a compressed video signal while the video decoder decompresses the compressed video signal. The graphics processor blends the decompressed video signal with graphics to generate a blended video image.

One embodiment of the present invention includes a method of performing multiple functions on data using a single set-top box prior to displaying the data. The method acquires the data in first standard format. The acquired data in the first standard format is converted to data in a second standard format. The data in the second standard format is processed and displayed.

Other aspects, advantages and novel features of the present invention, as well as details of an illustrated embodiment thereof, will be more fully understood from the following description and drawings, wherein like numerals refer to like parts.

BRIEF DESCRIPTION OF SEVERAL VIEWS OF THE DRAWINGS

These and other aspects of the invention may be understood by reference to the following detailed description, taken in conjunction with the accompanying drawings, which are briefly described below.

FIG. 4 illustrates a list of enhancements made to the QAM receiver illustrated in FIG. 3 according to one embodiment of the present invention;

DETAILED DESCRIPTION OF THE INVENTION

Figure 1:
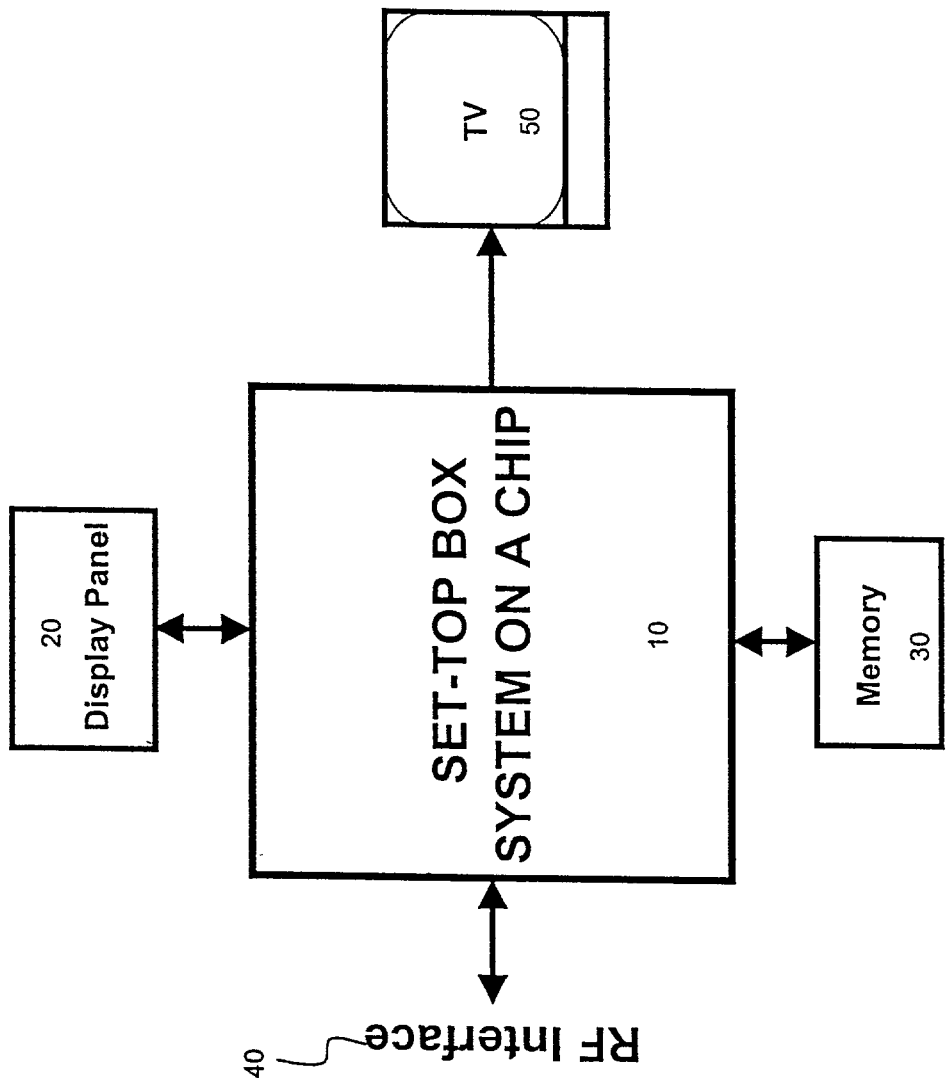
FIG. 1 illustrates a block diagram of a single chip set-top box system according to one embodiment of the present invention.

FIG. 1 illustrates a block diagram of a single chip set-top box system, generally designated 10, according to one embodiment of the present invention. The single chip set-top box system 10 interfaces with RF devices 40 to receive audio, video, data and/or graphics content for display on a display device, such as, for example, a display device 50. The display device 50 may include, but is not limited to, one or more of high definition television (hereinafter referred to as "HDTV"), standard definition television (hereinafter referred to as "SDTV"), computer monitor, and the like. Video and graphics signals transmitted to the display device 50 may include, but are not limited to, RGB, NTSC, PAL, SECAM, ATSC, S-video, DVI-compatible as well as any other standard or non-standard video and/or graphics signals.

The single chip set-top box system 10 may receive audio, video, data and/or graphics content using any combination of available communication media such as, for example, cable, landline (e.g., PSTN, ISDN, DSL), Internet, satellite links, free space, wireless links and the like. The single chip set-top box system 10 may be coupled to a memory 30 to store data during audio, video, data and/or graphics processing. Additionally, the single chip set-top box system 10 may be coupled to a display panel 20 to display set-top box control and/or configuration information.

Figure 2:
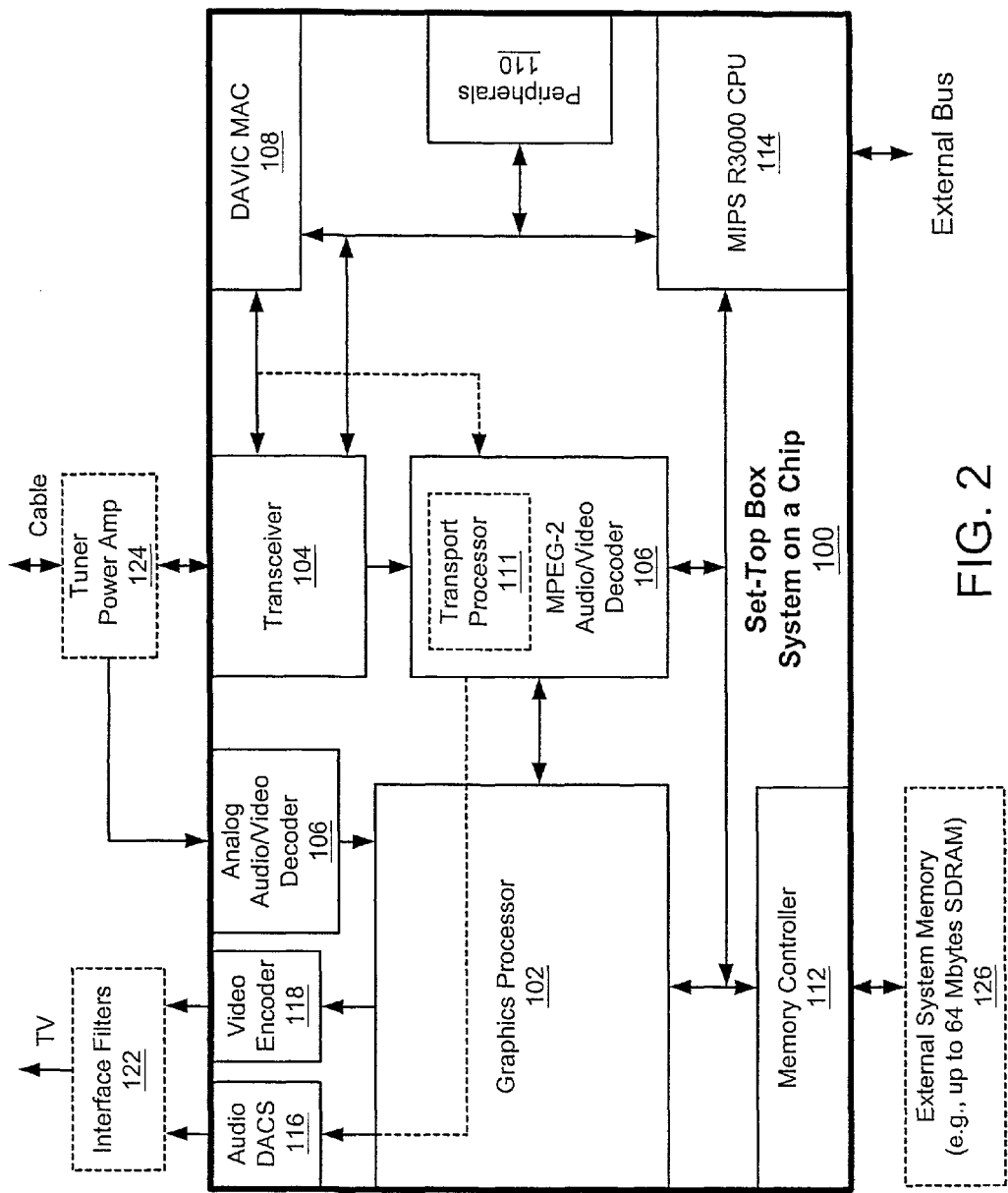
FIG. 2 illustrates a more detailed block diagram of the single chip set-top box system according to one embodiment of the present invention.

FIG. 2 illustrates a more detailed block diagram of one embodiment of single chip set-top box system 100, which may be similar to the set-top box system 10 illustrated in FIG. 1. The single chip set-top box system 100 includes a graphics processor 102, a transceiver 104, a MPEG-2 audio/video decoder 106, a Digital Audio-Visual Council (hereinafter referred to as "DAVIC") Media Access Controller (hereinafter referred to as "MAC") 108, peripherals 110, a memory controller 112, a central processing unit (hereinafter referred to as "CPU") 114, audio digital-to-analog converters 116, a video encoder 118 and an analog audio/video decoder 120. It is also possible that graphics processor 102 may have an input from an external digital audio/video source. It is contemplated that, in one embodiment, transceiver 104 may be coupled to an access control device discussed in greater detail with respect to FIG. 17. In addition, the system 100 interfaces to all analog signals with on-chip analog to digital and digital to analog converters.

The CPU 114 may, for example, be a MIPS R3000 CPU or any other suitable CPU. The CPU 114 according to one embodiment includes a 4K instruction cache (I-cache), 4K data cache (D-cache), a DMA arbiter and external bus interfaces. The CPU in other embodiments may have bigger or smaller sized I-cache and/or D-cache. The CPU 114 runs at 81 MHz, for example, and coordinates various different functions and accommodates various application program interfaces (APIs) using operation system and software. In one embodiment the CPU 114 uses the 4K I-cache and 4K D-cache for communications with all the internal blocks via a 32-bit MIPS internal system bus. The CPU interfaces with external devices via a 16-bit external bus protocol running at 40.5 MHz, for example. It should be appreciated that the bus widths and/or the processing speeds may be different in other embodiments.

Figure 3:
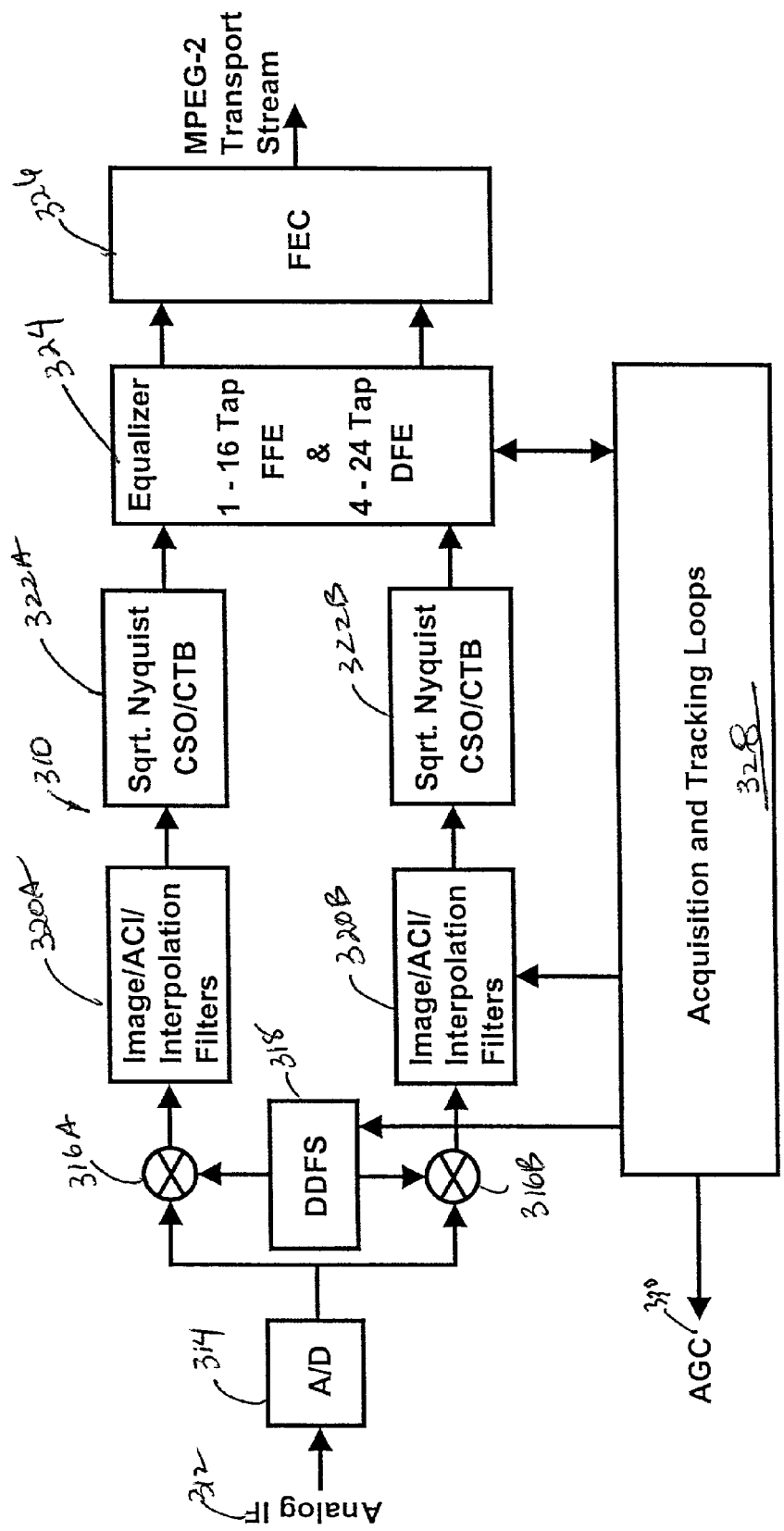
FIG. 3 illustrates a block diagram of a QAM receiver according to one embodiment of the present invention.

The transceiver 104 as illustrated includes a multi-function physical layer transceiver. The transceiver 104 may include one or more of an ITU-T J.83 transceiver, a 64/256-QAM receiver, a QPSK receiver, and a QPSK/16-QAM upstream transmitter. FIG. 3 illustrates a block diagram of the 64/256-QAM receiver according to an embodiment of the present invention discussed in greater detail below.

Figure 5:
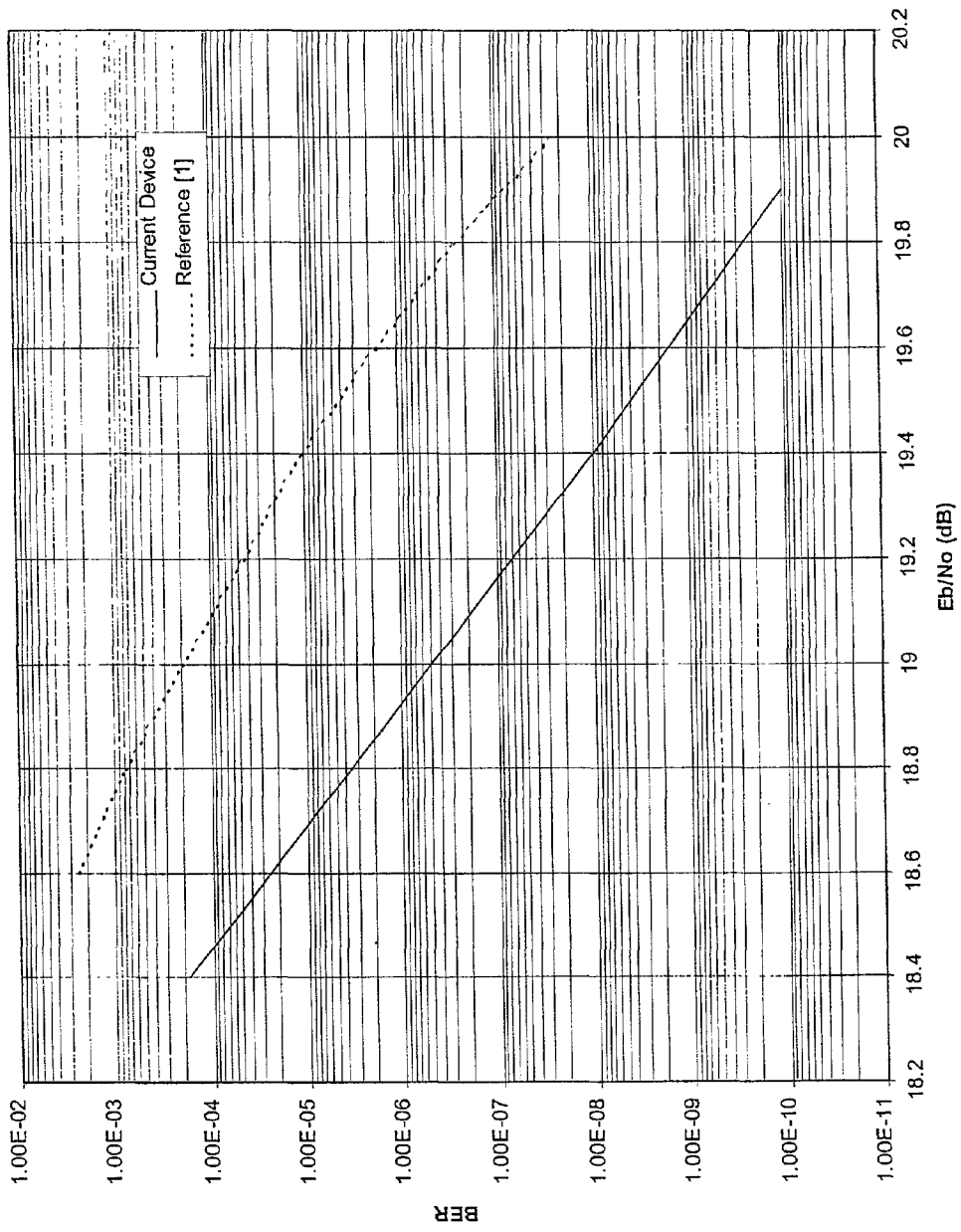
FIG. 5 illustrates a comparison of bit error rate between a QAM receiver according to one embodiment of the present invention and an earlier QAM receiver.

The transceiver 104 receives one or more MPEG-2 Transport streams as well as other transmitted contents from a cable or other communication media devices via a tuner/power amplifier 124. The transceiver 104 has enhancements including one or more of those listed in the table illustrated in FIG. 4. Due to these and/or other enhancements, the transceiver 104 is capable of achieving improved bit error rate (hereinafter referred to as "BER") performance as illustrated in FIG. 5. The enhancements include doubling the feed-forward taps of an equalizer, increasing word-length precision in the filters and equalizer, and adding filtering in the tracking loops.

Figure 6:
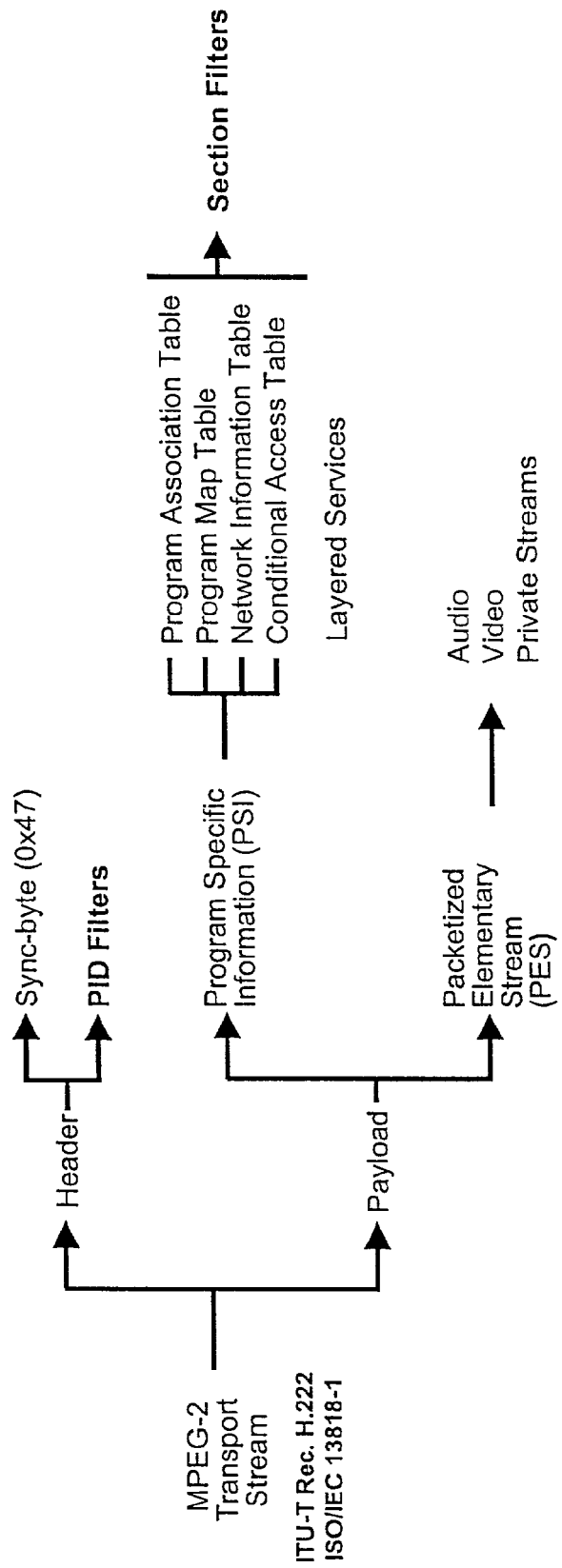
FIG. 6 illustrates a structure of an MPEG-2 Transport stream.

In one embodiment of the present invention, the MPEG-2 audio/video decoder 106 receives one or more MPEG-2 Transport streams from the transceiver 104 and also from DAVIC MAC 108 for MPEG layered on DAVIC. FIG. 6 illustrates one structure of a typical MPEG-2 Transport stream. The MPEG-2 Transport streams may include one or more in-band streams (high data rate streams such as audio or video data) and/or out-of-band streams (such as low data rate messaging communicated to or from the headend). It should be appreciated that in-band streams include, without limitation, such universal multi-standards as Annex A, Annex B or Annex C, while out-of-band streams include, without limitation, DAVIC, MPEG layered on DAVIC or straight MPEG.

The MPEG-2 audio/video decoder 106 preferably includes a transport processor, an audio decoder and a video processor, which may also be referred to as a video decoder. In one embodiment, the transport processor receives the MPEG-2 Transport streams. The MPEG-2 audio/video decoder 106 transmits video and graphics to the graphics processor 102 for processing. In other embodiments, the MPEG-2 audio/video decoder 106 may be used to decode audio, video and/or graphics in other data streams such as MPEG-1, MPEG-4 or other suitable MPEG or non-MPEG data streams.

Figure 7:
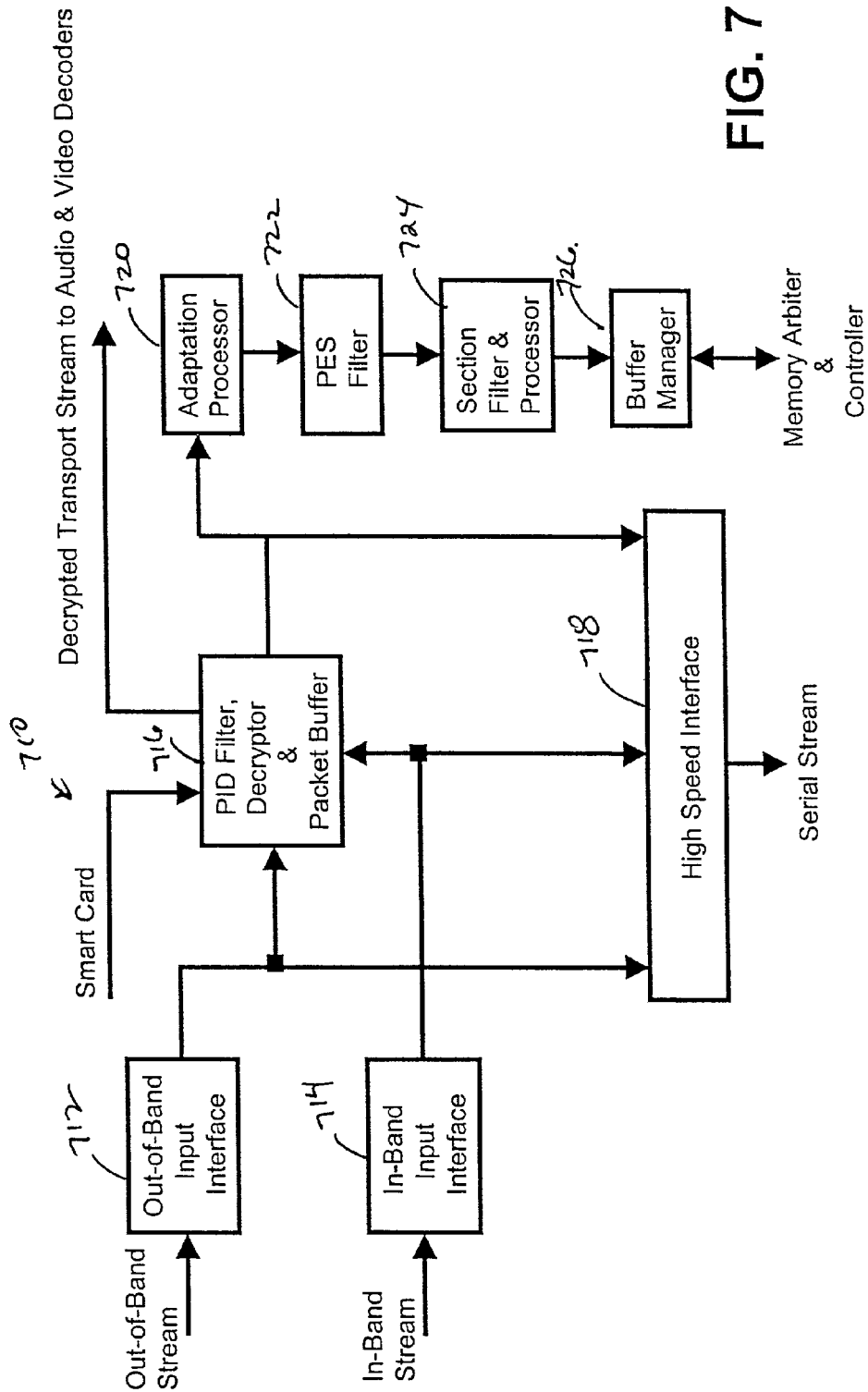
FIG. 7 illustrates a block diagram of a transport processor according to one embodiment of the present invention.
Figure 17:
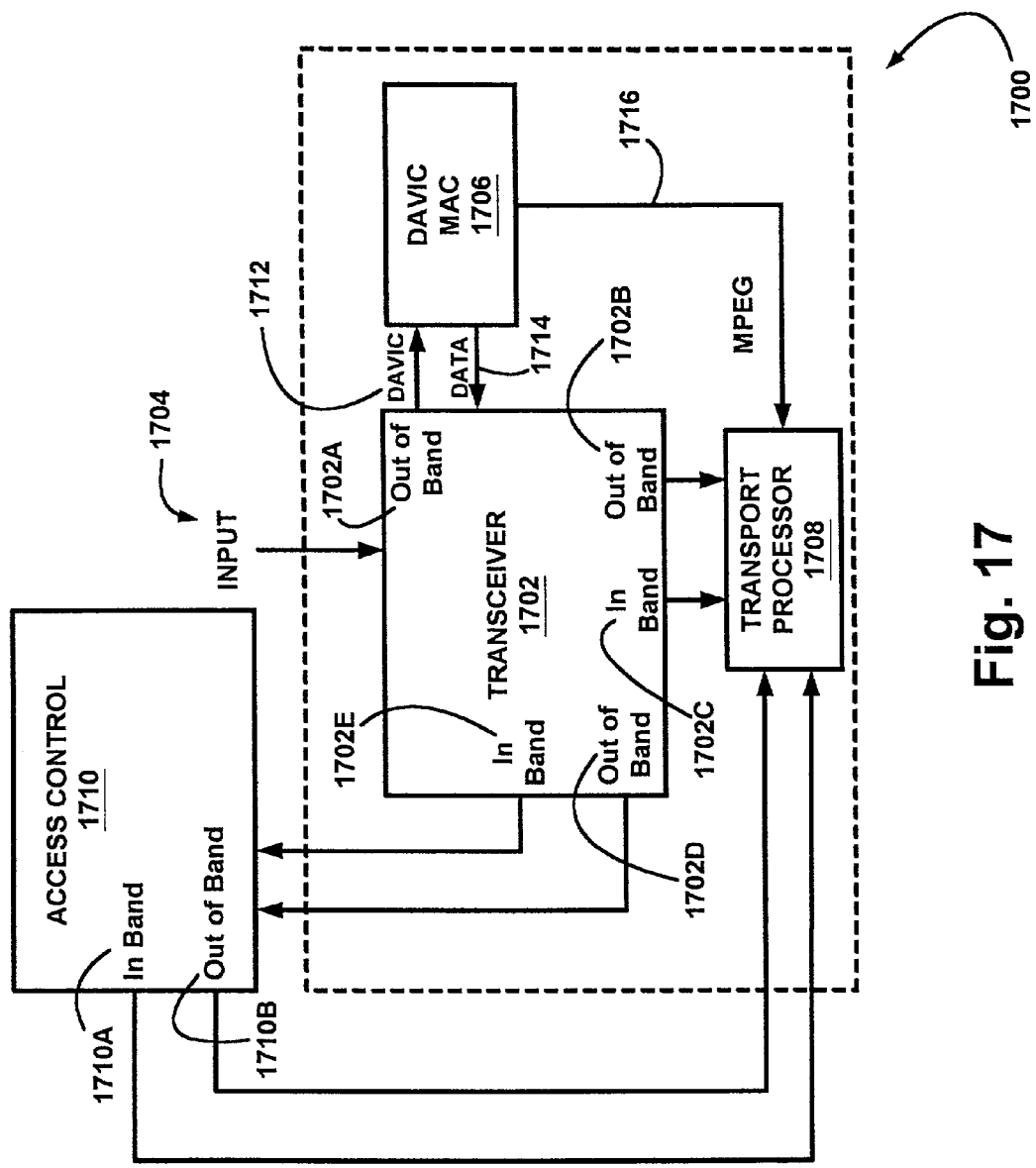
FIG. 17 illustrates a block diagram of transceiver and access control device used with a set-top box according to one embodiment of the present invention.

The transport processor may perform one or more of, but not limited to, PID filtering, encrypting, decrypting and packet buffering of the received Transport streams. It should be appreciated that transport processor may be incorporated into the transceiver 104 or as a separate block as illustrated in FIG. 17. FIG. 7 illustrates a block diagram of a transport processor according to an embodiment of the present invention. The transport processor may also perform one or more of, but is not limited to, adaptation processing, PES filtering and section filtering as well as encryption and decryption. In one embodiment, the transport processor transmits private data to the memory controller 112.

The transport processor includes a complex state machine that accepts serial data up to 60 MBits/sec from the in-band receiver and up to 3 Mbits/sec from the out-of-band receiver simultaneously. The MPEG-2 transport parser and demultiplexer extracts and decrypts the MPEG-2 video data, Dolby Digital audio data, and PCR from the input in-band transport stream. It extracts PSI and generic PES data from the input in-band or out-of-band data stream. In one embodiment, the demultiplexer includes a generic data filter, a high speed data filter, a video data filter, and an audio data filter. The data transport demultiplexer is capable of demultiplexing 44 data PIDs from the in-band or out-of-band data stream, for example, and supports 32 section filters.

Stream requirements dictate parallel comparisons for the filters that result in a register programmable hardwired implementation under state-machine control. The backend of the transport demultiplexer 106 interfaces to the memory arbiter that controls the system memory at 81 MHz over a 32-bit bus. The transport module supports a DVB and DES descrambler. The DVB engine supports full and conformance modes. The DES engine supports electronic code book and cipher block chaining modes with selectable residue termination modes of partial block unscrambled, residual block termination, and cipher-text stealing. This cryptosystem together with two on-chip smart card interfaces are used for conditional access control.

In one embodiment, the transport processor transmits decrypted Transport stream to the audio decoder and the video processor for audio and video decoding, respectively. The audio decoder and the video processor are included in the MPEG-2 audio/video decoder 106 in this embodiment.

Figure 8:
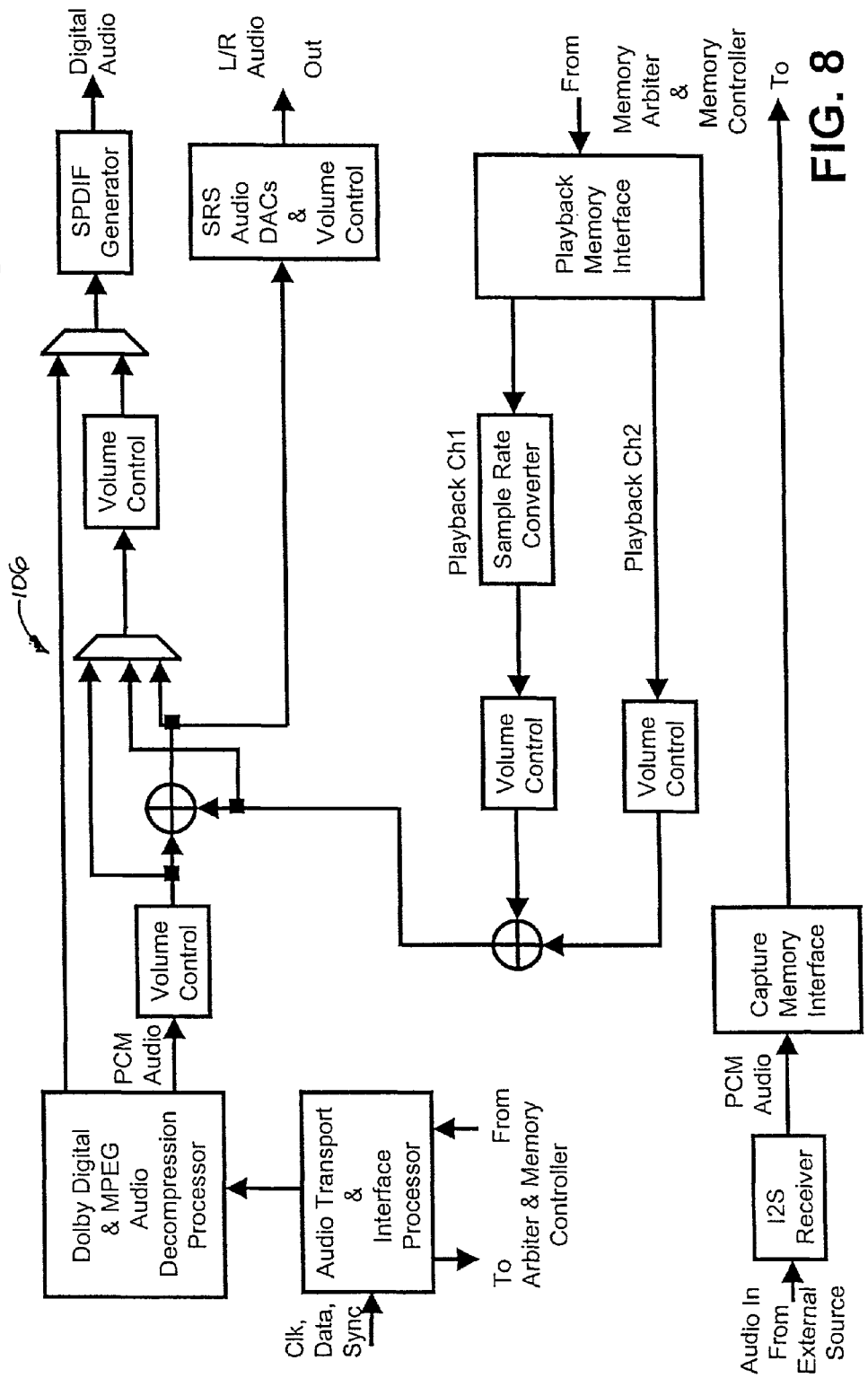
FIG. 8 illustrates a block diagram of an audio decoder according to one embodiment of the present invention.

FIG. 8 illustrates a block diagram of the audio decoder according to an embodiment of the present invention. The audio decoder, in this embodiment, includes a Musicam and Dolby Digital 5.1 channel audio decoder. The audio decoder may be implemented as several discrete hard-wired processing functions or as firmware (e.g., programmable ASIC) or as software (e.g., programmed in a processor).

Figure 9:
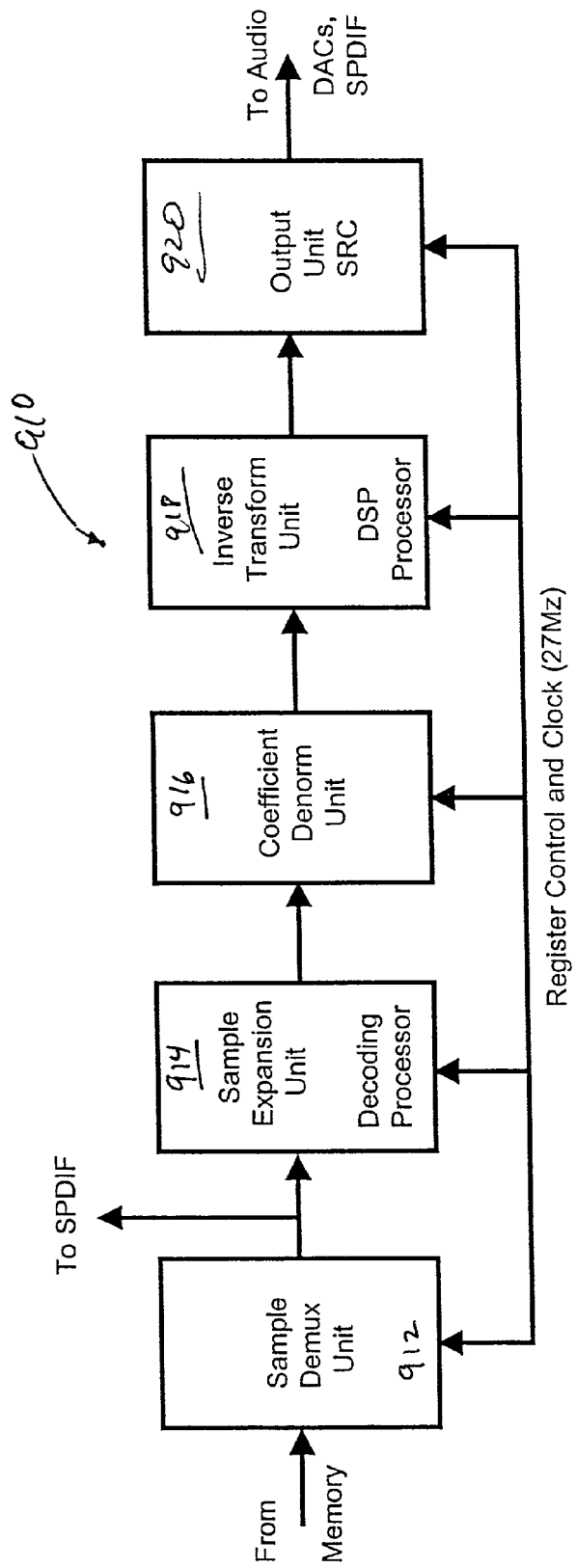
FIG. 9 illustrates a block diagram of an audio decompression processor according to one embodiment of the present invention.
Figure 10:
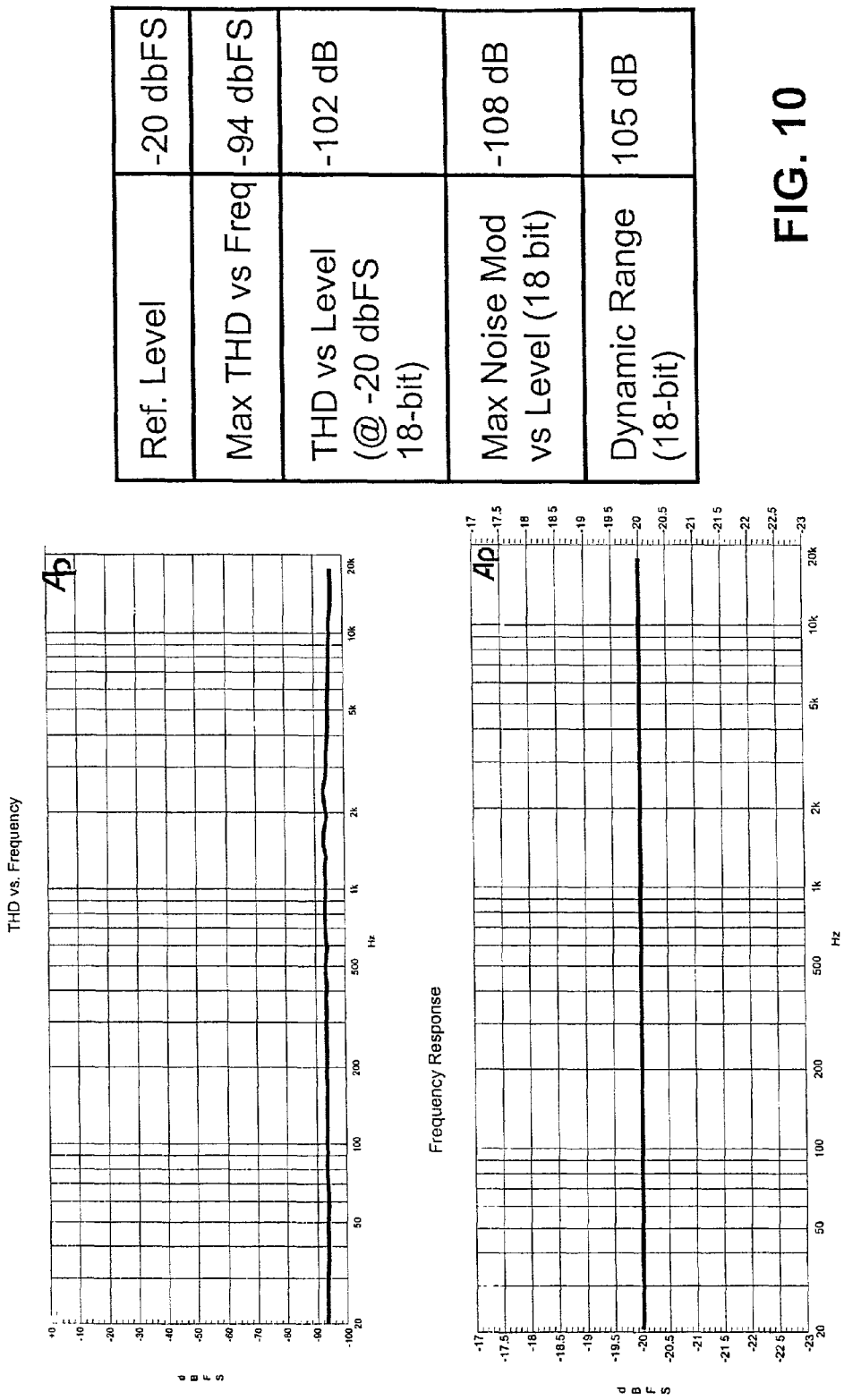
FIG. 10 illustrates a graph of measured audio performance according to one embodiment of the present invention.

The audio decoder includes an audio decompression processor. FIG. 9 illustrates a block diagram of the audio decompression processor according to an embodiment of the present invention. The audio decompression processor includes five modules which carry out the decoding process: sync and demux unit, sample expansion unit, coefficient denormalization unit, inverse transform unit, and output processing unit. The output PCM audio can interface with a 3-D audio engine and can be output either digitally over an SPDIF interface or in analog mode through a two-channel audio DAC. FIG. 10 illustrates graphs of measured audio performance.

Figure 11:
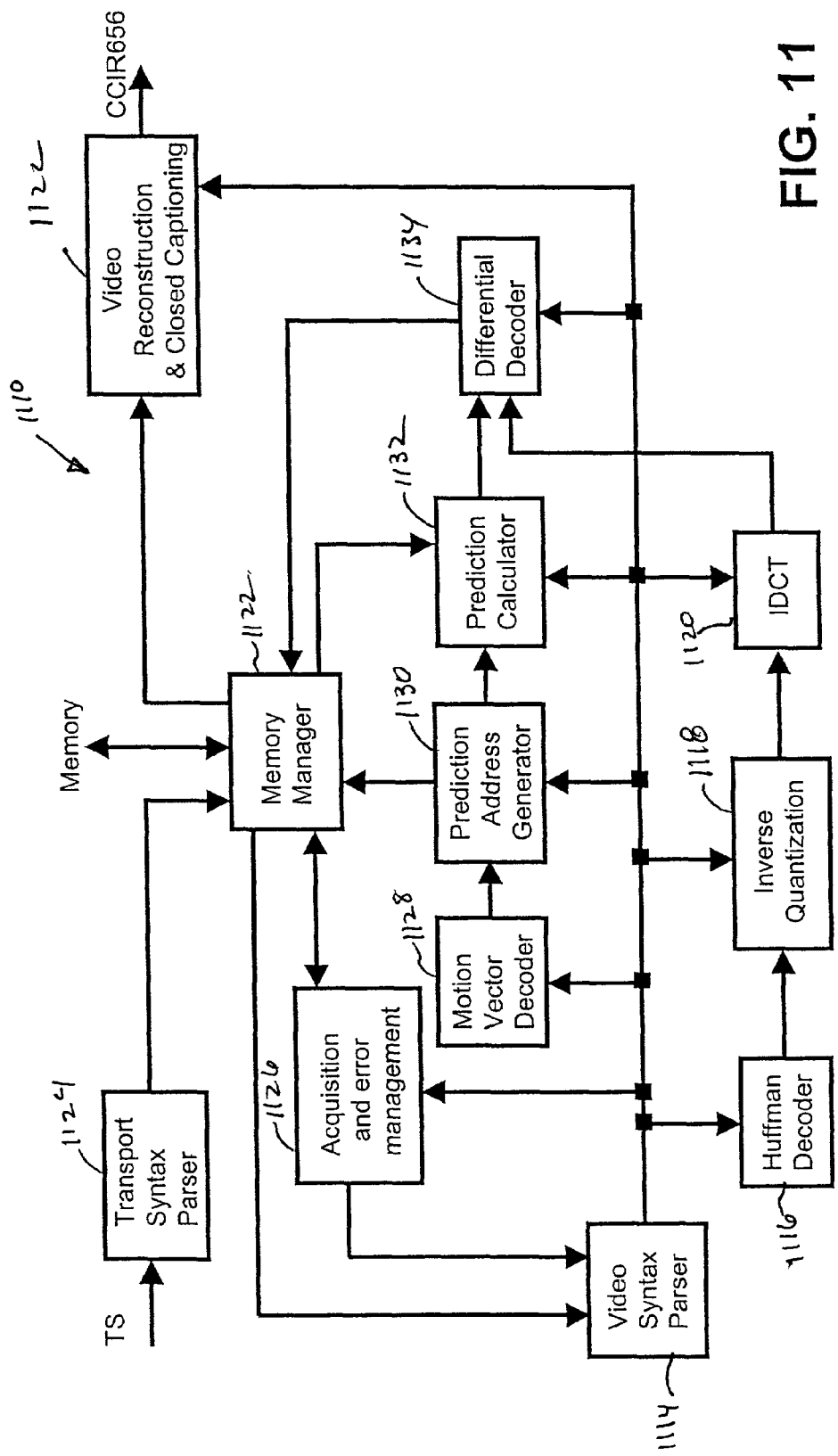
FIG. 11 illustrates a block diagram of a video processor according to one embodiment of the present invention.

FIG. 11 illustrates a block diagram of a video processor 1110 according to an embodiment of the present invention. The illustrated video processor parses and decodes the compressed video bit stream into a CCIR 656 standard digital output. In other embodiments, the video processor may format the compressed video bit stream into other types of analog and/or digital output. The video processor 1110 may include one or more of the following components to process video: a video buffer control block, a video syntax parser block 1114 for start code detection, a Huffman decoder block 1116 for fixed and variable length decoding, an inverse quantizer block 1118, the inverse discrete cosine transform (hereinafter referred to as "IDCT") block 1120, a memory manager block 1122, and a video reconstruction block for motion compensation and interpolation.

Figure 12:
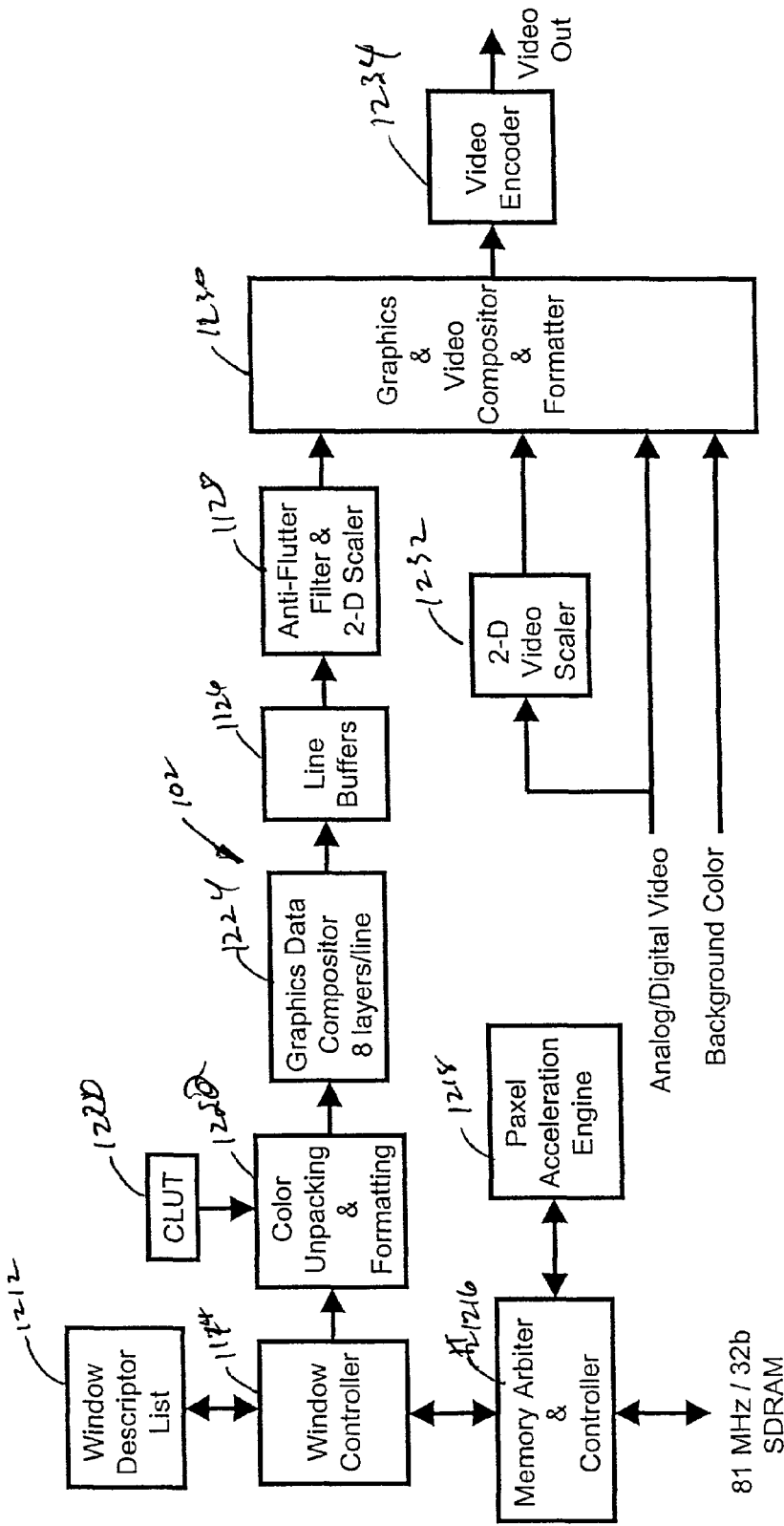
FIG. 12 illustrates a block diagram of graphics display architecture according to one embodiment of the present invention.

The graphics processor 102 may also be referred to as a graphics engine. FIG. 12 illustrates graphics display architecture according to an embodiment of the present invention. The graphics processor 102 receives video and/or graphics from the analog video decoder 120 and/or the MPEG-2 audio/video decoder. The graphics processor 102 may convert the video and/or graphics formats to blend them together prior to providing them to the video encoder 118.

The graphics processor 102 accepts or receives decoded MPEG and/or analog video and performs professional quality compositing of text and graphics with video. The graphics processor may be implemented in hardware, firmware (e.g., programmable ASIC) and/or software, or any combination thereof. The graphics processor used may be similar to corresponding devices disclosed in U.S. patent application Ser. No. 09/437,208, filed Nov. 9, 1999 and entitled "Graphics Display System" and U.S. patent application Ser. No. 09/641,374, filed Aug. 18, 2000 and entitled "Video, Audio and Graphics Decode, Composite and Display System," the contents of both of which are hereby incorporated by reference in full.

Figure 13:
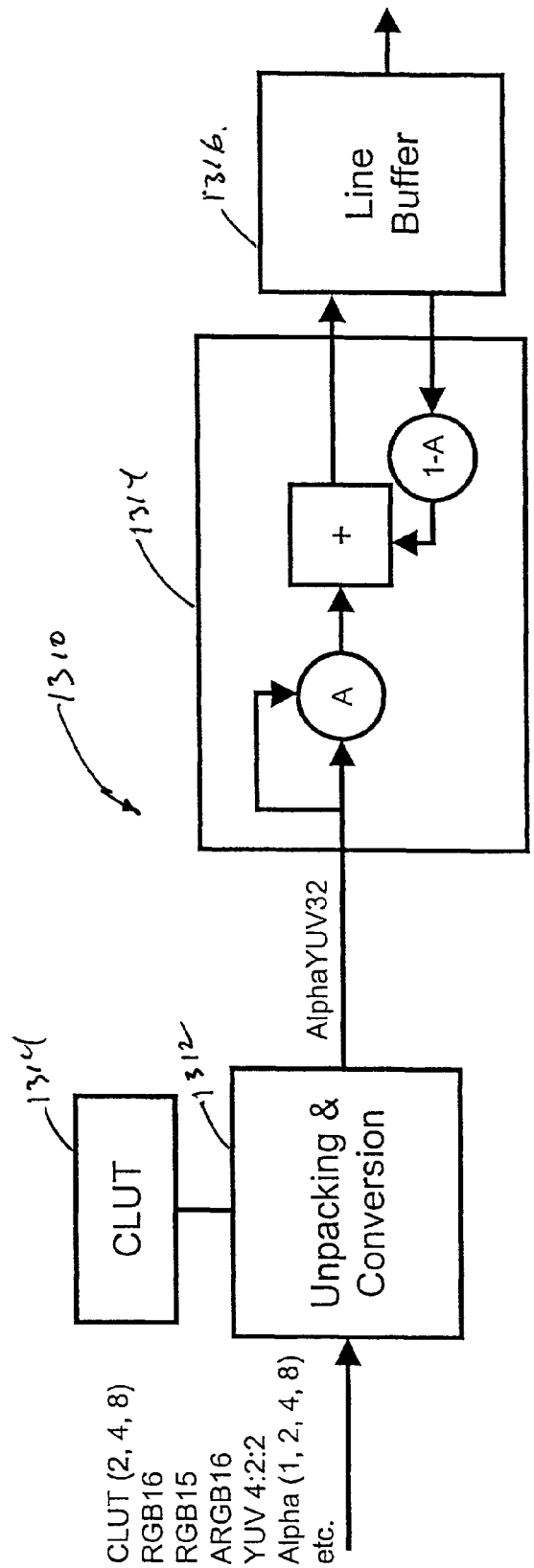
FIG. 13 illustrates a block diagram of a graphics compositor according to one embodiment of the present invention.

FIG. 13 illustrates a block diagram of a graphics compositor according to an embodiment of the present invention. The graphics processor preferably supports a variety of RGB, YUV and CLUT pixel formats, with one or more video/graphics surfaces having their own alpha blend factor. The graphics processor 102, in one embodiment, uses unified memory architecture that is controlled by a SDRAM arbiter and controller. Text rendition may be enhanced with the use of anti-aliasing and anti-flutter filters, which reduce the flutter effect that is inherent with the interlaced display of high resolution text and imagery while at the same time not affecting the display of normal or scaled live video, which is meant for interlaced display.

Figure 14:
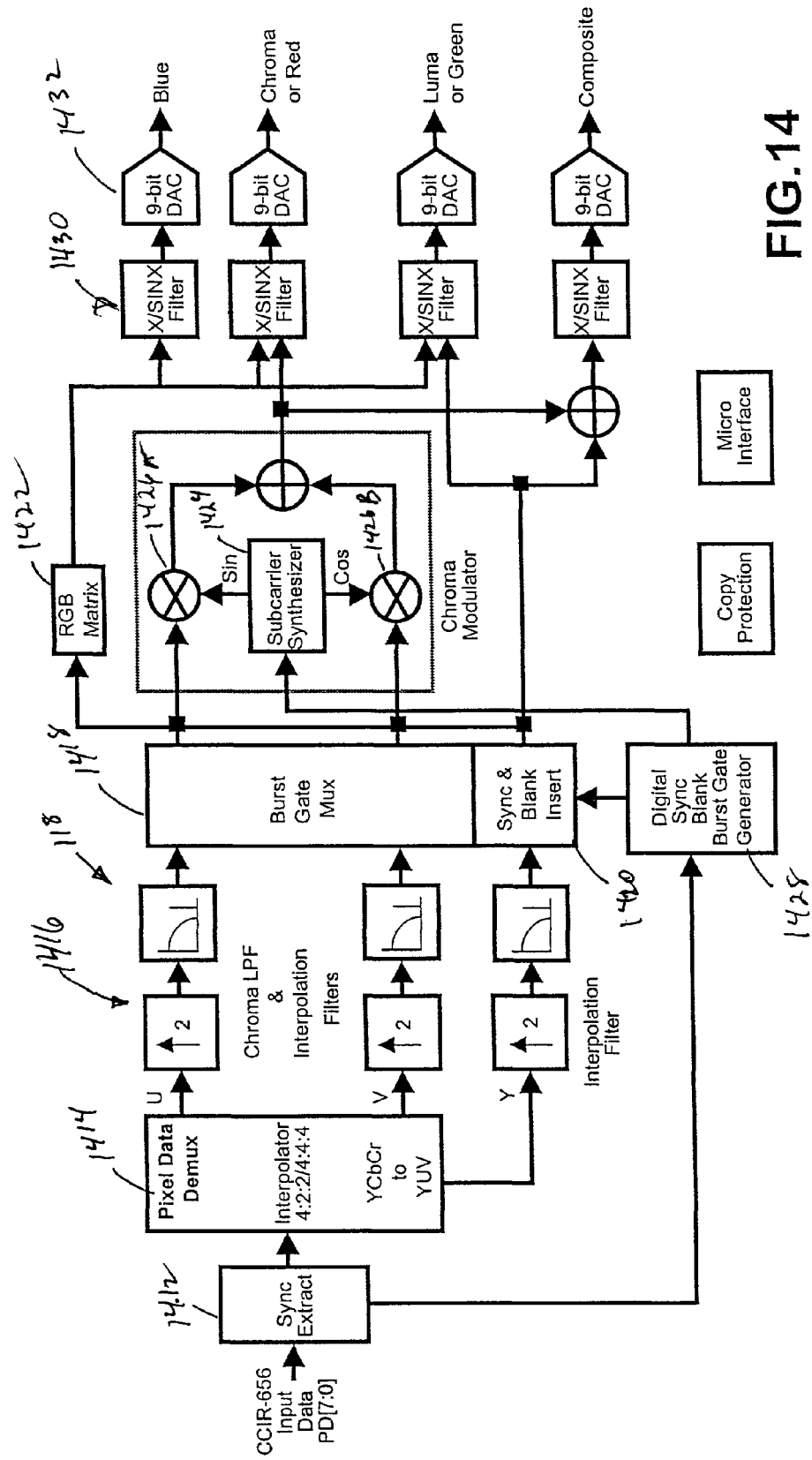
FIG. 14 illustrates a block diagram of video encoder architecture according to one embodiment of the present invention.

The video encoder 118 encodes and transmits the blended video and graphics to television for display via interface filters 122. FIG. 14 illustrates video encoder architecture according to an embodiment of the present invention. The video encoder 118 is capable of taking a CCIR-656 stream and displaying analog NTSC or PAL video in composite, S-Video and RGB formats with copy protection. In other embodiments, video encoder may be capable of displaying video streams in other formats. The video encoder 118 preferably generates the complete NTSC/PAL timebase with color-burst, de-multiplexes the input stream (e.g., 4:2:2, 4:4:4 or other multiplexed format), incorporates luminance and chrominance filters, modulates the chrominance, and combines signals for the appropriate display format through four, for example, on-chip video digital to analog converters (hereinafter referred to as "DACs").

In addition, graphics processor 106 can generate special effects sounds which are sent to decoder 106, and which are then mixed with the audio and sent to audio DACs 116. The audio DACs 116 digital-to-analog converts the received audio stream and transmits it to the television via the interface filters 122.

Figure 15:
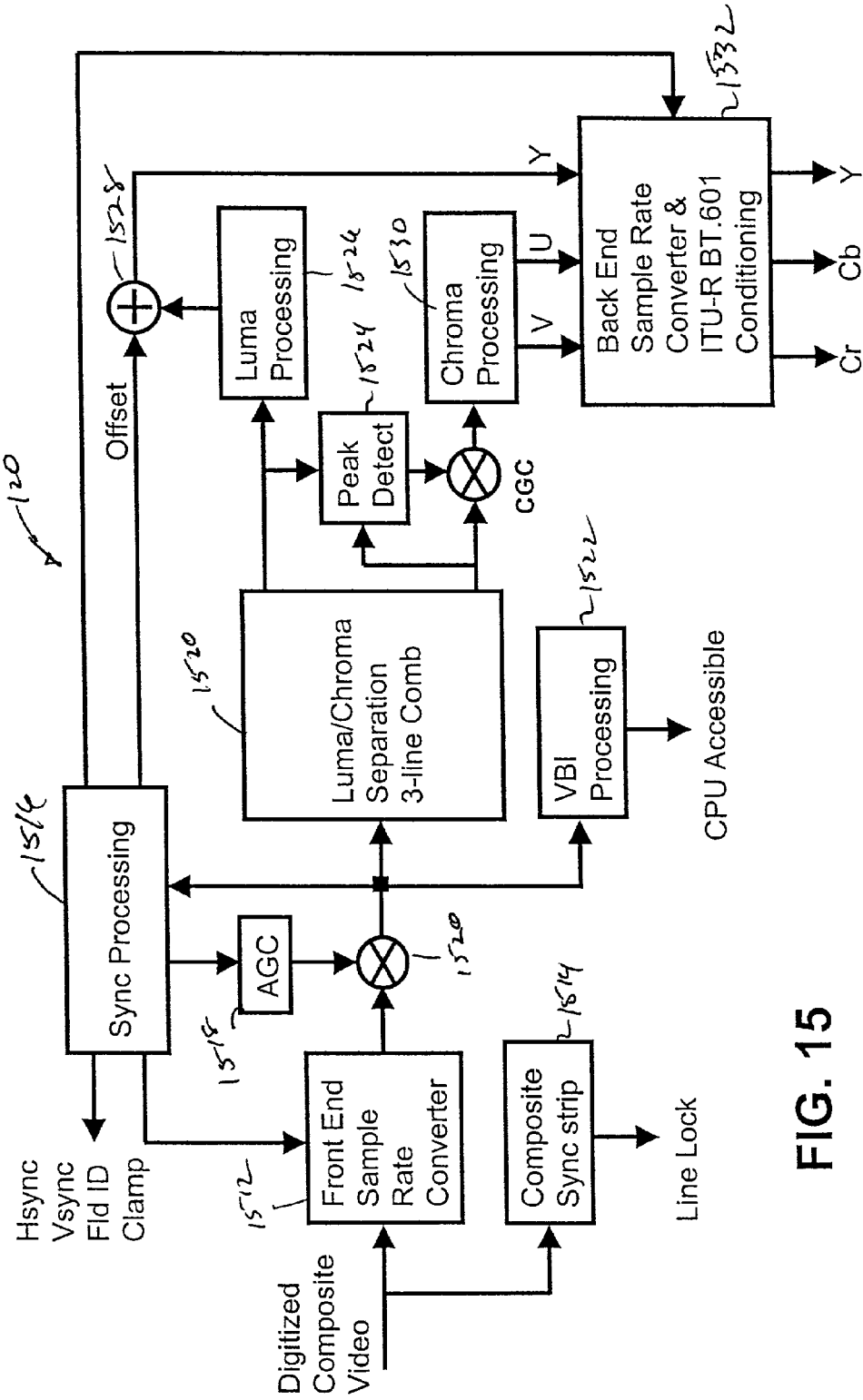
FIG. 15 illustrates a block diagram of an analog video decoder according to one embodiment of the present invention.

In one embodiment, the analog audio/video decoder 120 receives analog audio/video from cable via the tuner/power amplifier 124. FIG. 15 illustrates a block diagram of an audio/video decoder according to an embodiment of the present invention. The analog audio/video decoder digitizes the analog audio/video signal, which is provided or communicated to the graphics processor 102 for processing. The analog audio/video decoder 120 digitizes the analog audio/video, separates luminance and chroma using an adaptive 3-line comb filter for maximum quality, and has a robust synchronization mechanism including a time base corrector to adapt to a wide variety of noisy signal conditions.

Figure 16:
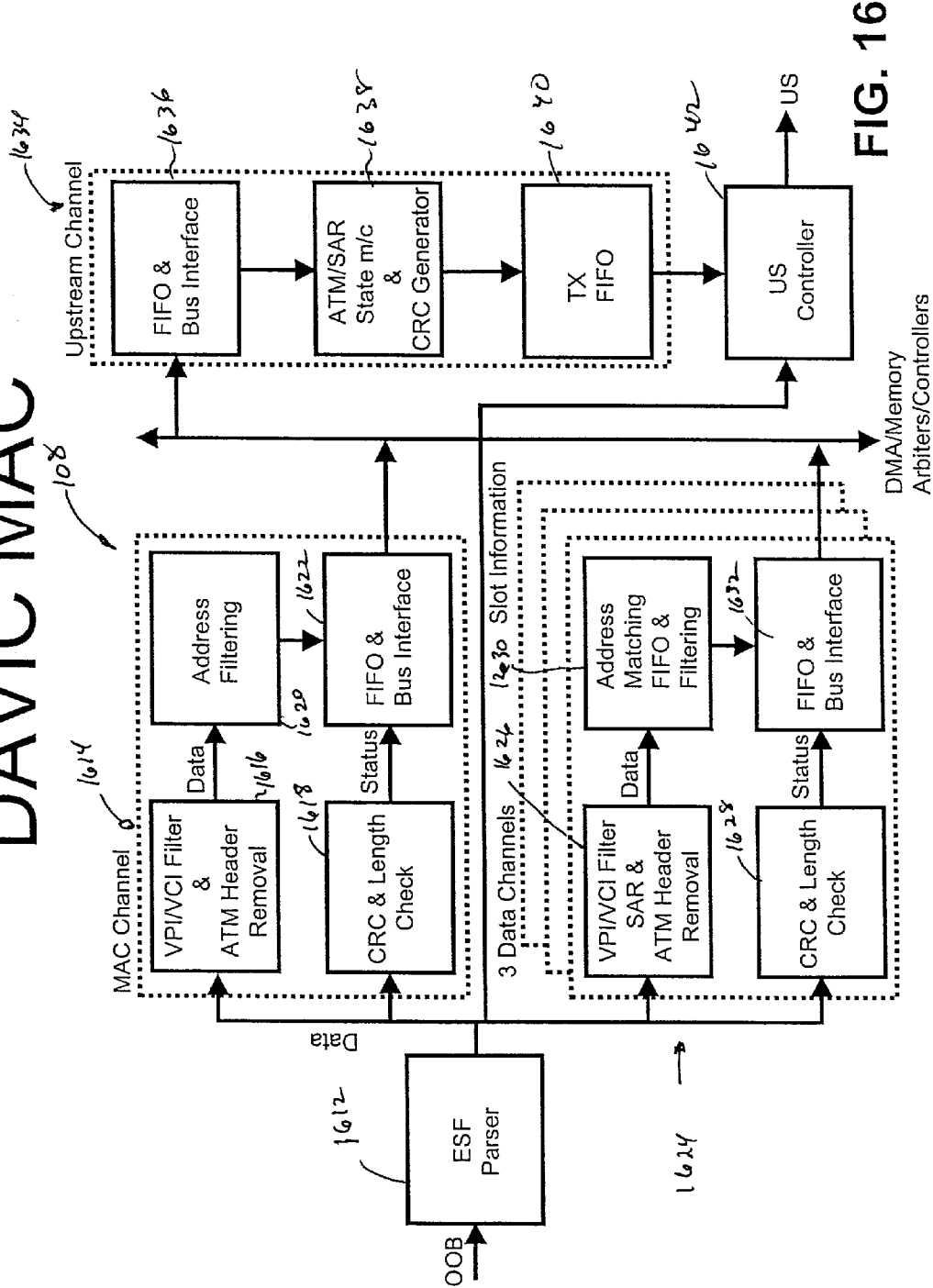
FIG. 16 illustrates a block diagram of a Digital Audio-Visual Council Media Access Controller according to one embodiment of the present invention.

The DAVIC MAC 108 complies with one or more Digital Audio-Visual Council specifications. FIG. 16 illustrates a block diagram of a DAVIC MAC according to an embodiment of the present invention. The DAVIC MAC 108 includes downstream and upstream processors for the out-of-band channel. The downstream processor receives error corrected ATM cells at up to 3.088 Mbits/sec and incorporates three virtual channel/path identifier (VCI/VPI) filters for IP encapsulated and generic data, and one channel for MAC messages. The DAVIC MAC 108 preferably supports length, CRC check and re-assembly, address filtering and checksum. Data storage and retrieval are performed through DMA channels to the external SDRAM. The upstream processor manages time slots, adjusts for upstream delays and automatically transmits on contention, ranging, reserved and fixed slots. The DAVIC MAC performs automatic ATM cell encapsulation, generating the header with error correction trailers. The DAVIC MAC is also capable of extracting MPEG layered on ATM protocols and sending it to the transport processor.

The peripherals 110 are used to interface with other devices and/or the user. The peripherals 110 may include one or more of UARTs, InfraRed (IR) remote control, IR keyboard, and the like.

The single chip set-top box system may include a QAM in-band receiver. The in-band receiver preferably samples a 2-8 MHz signal spectrum centered on a 36-44 MHz carrier frequency as delivered by common television tuners. The analog to digital converter (hereinafter referred to as "ADC") is preceded by a programmable gain amplifier (hereinafter referred to as "PGA") which provides 0-20 dB of signal gain before input to the sample-and-hold (hereafter referred to as "S/H") circuit in the ADC. The signal level at the input to the PGA may be set to 2.0 Vpp differential. The QAM in-band receiver may have different characteristics in different embodiments. The single chip set-top box system may also include a 10-bit ADC that is shared between the QAM in-band receiver and the on-chip analog video decoder (hereinafter referred to as "VDEC") used for an analog input channel.

The QAM in-band receiver may include a 4/16/32/64/128/256/1024-QAM, 1-7 MBaud variable rate demodulator. The in-band demodulater may include a quadrature mixer and multi-rate filters 320A and B which may convert the over-sampled IF data stream to a baseband complex data stream which is sampled in both frequency and phase, under the control of a clock recovery loop. The I and Q baseband signals may then be filtered by dual square-root Nyquist filters 322A & B which may accommodate roll-off factors of approximately 12-18% for various ITU-A and B applications. The outputs of these filters preferably are fed to a phase recovery and adaptive equalization block, which may also be referred to as an equalizer.

In the cable environment, there exists a possibility of narrowband co-channel interference caused by intermodulation products from analog cable television (hereinafter referred to as "CATV") channels. The in-band receiver may contain an adaptive filter 324 which places notches in the frequency spectrum at the locations of these subcarriers.

While the square-root Nyquist filters 324 may reduce inter-symbol interference (ISI), ISI may exist due to imperfect channel characteristics. A 40-tap decision feedback equalizer (hereinafter referred to as "DFE") 326 with 1-16 feedforward taps and 4-24 feedback taps may be included in the QAM receiver to reduce or remove the ISI generated by coaxial cable and/or wireless cable channels. The equalizer coefficients may, for example, be updated every baud cycle for fast convergence. Blind convergence algorithms may facilitate equalizer acquisition. In addition to adaptive equalization, the equalizer may also perform phase recovery on equalized constellation points by using a quadrature synthesizer and complex mixer under the control of a feedback loop 328 to track out instantaneous phase offsets such as those caused by tuner microphonics.

The single chip set-top box system may support two or more distinct forward error correction methods. In a first method, the FEC may be performed in accordance with ITU-T J.83 Annex A/C standard, which may also be referred to as DVB or DAVIC standard. In a second method, ITU-T J.83 Annex B standard, which may also be referred to as DigiCipher II, MCNS, or SCTE DVS-031, may be used.

The first method preferably includes four layers: frame synchronization, convolutional de-interleaving, Reed-Solomon (hereinafter referred to as "RS") error correction and de-randomization. During frame synchronization, MPEG framed data streams are recovered. The characteristics of the frame synchronization acquisition may be set via a control interface. The convolutional de-interleaving may be programmable. The interleaving depth I may be programmable from I=1-204 with M=204/I for example. Control may be supplied for an off-chip RAM that may be used for de-interleaving. In other embodiments, the single chip set-top box system may include on-chip RAM for de-interleaving.

The RS error correction (i.e., decoding) according to an embodiment of the present invention uses a t=8, (n,k)=(204, 188) shortened RS code derived from the (255,239) code defined by a generator polynomial: $g(x)=(x+a^0)(x+a^1) \ldots (x+a^{15})$ and a primitive polynomial: $p(x)=x^8+x^4+x^3+x^2+1$. De-randomization of the data stream is performed to undo the energy dispersal function inserted at the encoder. In one embodiment, the de-randomizer is synchronized to the inverted sync byte, and is based on a linear feedback shift register with a generator polynomial: $1+x^{14}+x^{15}$. The output preferably includes MPEG-2 serial data, packet sync, and a data clock. The FEC block preferably signals the case of an uncorrectable error by setting a Transport Error Indicator (hereinafter referred to as "TEI") flag (when enabled) in the MPEG-2 stream.

The second method preferably includes 5 layers: trellis decoding, de-randomization, de-interleaving, RS decoding and checksum decoding. This use of a concatenated coding scheme along with interleaving may provide approximately 2 dB superior coding gain over the first method in a Gaussian noise environment. The trellis decoding preferably operates on soft decisions from the in-band receiver and decodes these via an effective rate 14/15 decoder for 64-QAM and rate 19/20 decoder for 256-QAM. In other embodiments, forward error correction (FEC) may be defined for other QAM constellations.

De-randomization of the data stream preferably is performed to undo the energy dispersal function inserted at the encoder. This de-randomizer preferably is synchronized to a super frame, and is based on a linear feedback shift register (LFSR) with a generator polynomial: $x^3+x+a^3$. The characteristics of the super frame synchronization acquisition and retention may be set via a control interface. In the second method, the FEC may include programmable convolutional de-interleaving. The interleaving depth (I,J) preferably is programmable. In one embodiment, off-chip RAM is used during de-interleaving. In other embodiments, an on-chip RAM may be used during de-interleaving.

The RS decoding is performed using a t=3, (n,k)=(128, 122) extended RS code defined by a generator polynomial: $(x+a)(x+a^2) \ldots (x+a^3)$ and a primitive polynomial: $p(x)=x^7+x^3+1$. In one embodiment, the checksum decoding performed based on an LFSR. The use of the checksum enables errored MPEG packets to be flagged with little probability of failure. The output may include one or more of MPEG-2 serial data, packet sync, and a data clock. The FEC block 326 signals the case of an uncorrectable error by setting the Transport Error Indicator (hereinafter referred to as "TEI") flag in the MPEG-2 stream. The checksum decoding may be bypassed in some embodiments.

The in-band receiver according to an embodiment of the present invention has provisions for at least two automatic gain control loops (hereinafter referred to as "AGC"). A first loop preferably is closed locally at the PGA and is referred to as the inner loop or simply the AGC loop. A second loop preferably is closed at the tuner and is referred to as the outer loop or the delayed-AGC loop. The complete gain control task in one embodiment is divided between the two loops. Each loop includes a power estimate, a threshold comparison and a first order loop filter. The filter output preferably is used to control the PGA gain in the case of the inner loop and is communicated into a sigma-delta modulator for the creation of an analog control voltage in the case of the outer loop. The gain of each loop may be set via a control interface.

One embodiment of the single chip set-top box system may include a baud recovery loop. The baud recovery loop may include a timing error discriminant, a loop filter and a digital timing recovery block which preferably controls a digital re-sampler. Re-sampling the signal may eliminate the need to pull the crystal and may enable demodulation of a wide range of baud rates. The timing error discriminant may output a new value each baud, which may be filtered by a digital integral-plus-proportional lowpass filter, featuring programmable coefficients. The loop integrator may be read for loop monitoring or written for direct control. The upper bits of the loop filter may be applied to a digitally controlled frequency synthesizer which may allow the baud rate to be varied from 1 to 7 Mbaud.

One embodiment of the single chip set-top box system may include an in-band carrier/de-rotator loop. The carrier/de-rotator loop may include a high-speed all-digital phase/frequency de-rotator circuit capable of tracking out relatively large amounts of frequency offsets and phase noise such as those contributed by conventional tuners. The loop may use a decision directed phase discriminant to estimate the angle and direction for phase/frequency compensation. The loop may be filtered by an integral plus proportional filter, in which the integrator and linear coefficients of the filter may be programmable to provide means of setting the bandwidth of the loop. The upper bits of the loop filter may be used to control the complex de-rotator, providing phase resolution of 0.088 degrees. The integrator may be read for loop monitoring and may be directly written. The carrier/de-rotator loop may be frozen or reset, independently of other synchronization loops.

The receiver may provide an on-chip voltage controlled oscillator (hereinafter referred to as "VCO") referenced to a single off-chip crystal which may provide chip clocks used. In addition, a spare delta-sigma digital-to-analog converter ("DAC") may be provided for optionally setting external DC voltages for controlling VCOs and/or AGC amplifiers. The interface between the in-band FEC and the conditional access may be provided using one or more pins of the single chip set-top box system.

The out-of-band receiver in one embodiment of the single chip set-top box system may contain a frequency agile local oscillator (hereinafter referred to as "LO") which may be used with an external mixer to down convert any channel in the approximately 70-130 MHz frequency range to a SAW centered IF. The desired channel may then be sub-sampled by a 6-bit ADC at a rate that preferably is more than 4× the symbol rate. The step size of the LO may be 10 KHz. In other embodiments, other frequencies, other resolution ADC and other step sizes may be used.

The single chip set-top box system, in one embodiment may include an out-of-band QPSK demodulator. The out-of-band QPSK demodulator receives an IF sampled input from the ADC and down converts it to baseband with a full quadrature mixer driven by the carrier recovery loop. The resulting true-baseband data stream is resampled under the control of the clock recovery loop to produce a data stream which is sampled in both frequency and phase. The I and Q baseband signals may then be filtered by dual square-root Nyquist filters which may accommodate roll-off factors of approximately 30 to 50%.

The single chip set-top box system may include an out-of-band adaptive equalizer. In one embodiment, the adaptive equalizer provides a 4-tap decision feedback equalizer (hereinafter referred to as "DFE") with 2 feedforward taps and 2 feedback taps, which may be sufficient to remove the ISI generated by coaxial cable channels including a wide variety of impairments such as unterminated stubs. The equalizer coefficients may be updated every baud cycle for fast convergence.

In one embodiment, the single chip set-top box system may include an out-of-band FEC block. The out-of-band FEC block may include 4 layers: frame synchronization, de-intedeaving, RS decoding, and de-randomization. These layers may be programmable to handle both the DigiCipher II and DAVIC out-of-band FEC specifications. The DAVIC code may include a T=1(55,53) RS code and the DigiCipher II may include a T=1(96,94) RS code.

The out-of-band receiver in one embodiment the single chip set-top box system may have provisions from two automatic gain control loops (hereinafter referred to as "AGC:). The first loop may be closed locally at the PGA and may be referred to as the inner IF loop or simply the AGC loop. The second loop may be closed at the tuner and may be referred to as the outer tuner loop or the delayed-AGC loop. The complete gain control task may be divided between the two loops. Each loop may include a power estimate, a threshold comparison and a first order loop filter. The filter output may be used to directly control the 6-bit PGA gain in the case of the inner loop and may be fed into a sigma-delta modulator for the creation of an analog control voltage in the case of the outer loop. The gain of each loop may be set via a control interface.

The single chip set-top box system may, in one embodiment, include an out-of-band baud loop. The baud recovery loop may include a timing error discriminant, a loop filter and a digital timing recovery block which may control a digital resampler. The timing error discriminant outputs a new value each baud, which may be filtered by a digital integral-plus-proportional lowpass filter, which may feature programmable coefficients. The loop integrator may be read for loop monitoring or written for direct control. The upper bits of the loop filter may be applied to a digitally controlled frequency synthesizer, enabling the baud rate to be varied over the range of approximately 0.772 to 1.544 Mbaud. This loop may be frozen or reset, independently of other synchronization loops. In other embodiments, the baud rate may be varied over other ranges.

In one embodiment, the single chip set-top box system may include an out-of-band carrier loop. The out-of-band carrier loop may include an all-digital loop, which may use a decision directed phase discriminant to estimate the angle and direction for frequency/phase compensation. The loop may be filtered by an integral plus proportional filter, in which the integrator and linear coefficients of the filter may be programmable 2's-complement numbers. These may provide means of setting the bandwidth of the loop. The output of the loop filter may be used to control the complex derotator. The integrator may be read for loop monitoring and/or directly written. This loop may be frozen or reset, independently of the other two out-of-band synchronization loops.

The single chip set-top box system may include in-band and/or out-of-band signal-to-noise ratio (hereinafter referred to as "SNR") estimators. The SNR estimators may continuously monitor the SNR on the two channels. The SNR estimators may include lossy accumulators which may maintain a running average estimate of the magnitude of the error signals over past cycles on both the in-band and out-of-band channels. These estimates may be read directly, and/or used to indicate a loss or gain of lock by comparing to two programmable thresholds. The results of these comparisons may be used to generate maskable interrupts. The time constant of the SNR estimators may be programmed to one of four possible values.

One embodiment of the single chip set-top box system may include an out-of-band interface to transport. The output of the out-of-band FEC may either be a DigiCipher II serial stream or a DAVIC stream with appropriate DAVIC controls. In the case of DigiCipher II, the clock, data and sync signals may interface to the on-chip transport demultiplexer. In the DAVIC case, the signals interface with the on-chip DAVIC MAC. In other embodiments, an external MAC device may be used and appropriate interfaces may be provided. The single chip set-top box system may include an out-of-band POD interface. Clock and serial data may be output before or after forward error correction (FEC). The QPSK data prior to FEC may be used to interface to an external ASIC for POD use. In this case, no POD specific processing may be done on-chip. The QPSK data before or after FEC may also be used for performance monitoring.

The single chip set-top box system may provide a Starvue, MCNS, DAVIC compatible 4/16-QAM upstream burst FEC encoder and modulator. A 1 KB burst FIFO buffer may be used to provide input data rate de-coupling. The FEC encoder may include a programmable randomizer and programmable RS encoder. The FEC encoder may also include a programmable preamble prepend, programmable symbol mapper, and a programmable transmitter pre-equalizer. The modulator may, for example, include dual square-root raised cosine filters with programmable excess bandwidth, a=0.25 or a=0.50 for example, interpolation filters, and a digital upconverter which may translate the shaped pulse to a digitally tunable IF center frequency. A 10-bit DAC then may be used to convert this signal to an analog waveform with programmable output power levels. The step size for the output power levels may be 0.4 dB up to 25 dB in one embodiment. The upstream transmitter preferably is supplied with serial data either internally (from the Upstream DMA) or externally from an external DAVIC MAC interfacing to its pins. The upstream transmitter preferably has a capability to bypass its front end and accept I,Q QPSK symbols directly from pins to interface to a POD.

The single chip set-top box system may include a burst FIFO buffer. Data to be transmitted may be first placed in a 1 KB burst FIFO buffer. This FIFO preferably de-couples the input data rate from the transmission data rate. This dual-access buffer enables data to be input while a burst is being transmitted.

The FEC included in the single chip set-top box system in one embodiment uses a block coding scheme to provide coding gain to combat both Gaussian noise and impulse errors. The FEC may include the following layers: a randomization layer and a Reed-Solomon layer. The randomization layer may be used to randomize the data to the modem, providing an even distribution of symbols in the constellation, which may enable the modem to maintain proper lock. The generator polynomial and initial seed may be programmable to 23 bits. Also, the randomizer may be programmable to be either frame-synchronizing or self-synchronizing. The parallel-to-serial conversion of bytes entering the randomizer and serial-to-parallel conversion of bits leaving the randomizer may be programmed to be MSB or LSB first for example. The RS encoder may be over GF(256) and may be programmable to correct from 0 to 10 symbol errors within an RS block. The FEC may be configured to have the randomizer located either before or after the RS encoder. The randomizer and RS encoder produce block codewords which may be passed to the preamble prepend and symbol mapping block.

A programmable length preamble of up to 1024 bits may in one embodiment of the present invention be prepended to the data stream following the FEC encoder. The value of the preamble may also be programmed through control registers. A $\pi/4$ DQPSK/QPSK/QAM symbol mapper may be used to support $\pi/4$ DQPSK, QPSK and 16-QAM modulation formats. Other modulation formats may be supported in other embodiments. The modulation may also include differential or non-differential encoding. The single chip set-top box system may contain a programmable transmitter pre-equalizer which may be used to cancel ISI.

The single chip set-top box upstream transmission system may include dual square-root Nyquist filters. The modulator may take the output from the symbol mapping block and spectrally shape the data using the dual square-root Nyquist filters, with programmable excess bandwidth, alpha=0.25-0.5 for example. The maximum passband ripple of these filters may be less than 0.05 dB for example and the minimum stopband attenuation may be greater than 60.0 dB for example. The filters may have other characteristics in other embodiments.

One embodiment of the single chip set-top box upstream transmission system may include variable interpolation filters, which may follow the pulse shaping filters. The variable interpolation filters may interpolate the signal up to the sample rate. These filters may maintain the fidelity of the signal at the output of the shaping filters with no appreciable degradation of the overall responses. The output of the spectral shaping filters may be modulated onto quadrature carriers by a digitally tunable frequency synthesizer. This enables the spectrum to be centered on a programmable IF frequency of up to ½ of the sampling rate. A 10-bit DAC may be provided on-chip to convert the digital shaped output data burst to an analog waveform. The DAC may have a sample rate of 200 MHz, and may have programmable output attenuation up to 25.2 dB in 0.4 dB steps. The DAC in other embodiments may have different characteristics.

The single chip set-top box system in one embodiment may include a serial input interface that preferably operates in any of three different modes. The first mode preferably is compatible with the DAVIC A0 and ATM Forum UTOPIA physical serial interface standards. In this mode, the transmit data clock comes from the data source. A generic byte based interface is also provided. Alternatively, the user can choose to have the system supply a continuous data bit clock.

The single chip set-top box system supports, for example, three mechanisms for upstream data transmission. In the first mechanism, a DMA controller internally supplies the upstream transmitter with data from internal memory. The information to be transmitted is stored in a 1KByte on-chip memory by the CPU. The DMA controller then accesses this memory, serializes the data and supplies it to the upstream transmitter. In the second mechanism, the DAVIC MAC supplies the upstream transmitter with serialized data from system memory with or without on the fly formatting. In the third mechanism, data is supplied to the upstream transmitter directly from pins.

The single chip set-top box system may include a DAVIC MAC that supports out-of-band downstream, out-of-band upstream and in-band downstream messaging. It is DAVIC 1.5 compatible, without the support of minislots and hardware security.

The DAVIC MAC preferably includes an out-of-band (hereinafter referred to as "OOB") downstream processor that preferably supports downstream rates of 1.544 and 3.088 Mbits/s. In one embodiment, the OOB downstream processor synchronizes to the ESF bit stream, retrieves the M and R bits, and then receives the error corrected ATM cells. Three VCI/VPI filters are preferably provided, with length and CRC check and reassembly for each. One VCI/VPI is for MPEG encapsulated data, which is routed to the transport block for further processing. One VCI/VPI is for messages, with address filtering and DMA to external DRAM. One VCI/VPI is for generic data or IP datagram, with IP address filtering ad checksum support. The received data will also be sent to external DRAM.

The DAVIC MAC in one embodiment includes an OOB upstream processor that supports upstream rates of 256Kbits/s, 1.544 and 3.088 Mbits/s. It preferably manages the slot counter and calculates the slot type boundaries. It adjusts for upstream delays and automatically transmits on contention, ranging, reserved and fixed slots. The DAVIC MAC performs automatic ATM cell encapsulation, generating the header with HEC, CRC and trailers. Software need only supply the VCI/VPI, slot numbers to the transmit slot number FIFO, and the DMA address and length of the PDU. The upstream processor matches the slot numbers, reads via DMA the transmit data, generates the ATM cells and transmits them, and retrieves the RI flags for confirmation. Transmit FEC calculations are also performed.

The DAVIC MAC includes an in-band (IB) downstream processor that parses the MPEG-TS for MAC messages, and retrieves the M and R bits and RI flags. The IB downstream processor preferably generates timing and slot count information for the OOB upstream processor. In one embodiment, PID and MAC address filtering are also supported.

The single chip cable set-top box system includes an MPEG transport demultiplexer that extracts and decrypts, if enabled, the MPEG-2 video data, Dolby Digital audio data, and PCR from the input in-band transport stream. Additionally, it extracts PSI and generic PES data from the input in-band or out-of-band data stream. The demultiplexer includes a generic data filter, a high speed data filter, a video data filter, and an audio data filter. It also includes the program clock reference processor and the time stamp processors. The demultiplexer performs automatic acquisition and synchronization. In addition, built-in automatic handling of exception and error conditions preferably exist internal to the demultiplexer. The data transport demultiplexer is preferably capable of demultiplexing 44 data PIDs (which can be PSI or PES) from the in-band or out-of-band data stream, for example, and supports 32 section filters. The transport demultiplexer is capable of de-multiplexing one current audio PID, one next audio PID, one audio PCR PID, one PLL PCR PID, one current video PID, one next video PID, and one video PCR PID from the in-band data stream.

The in-band front end interfaces to access control pins. The input data rate to the in-band transport demux is, in one example, 60 Mbps maximum. The transport demux can also interface directly to the out-of-band receiver or the on-chip DAVIC MAC via an internal 3-wire interface. The out-of-band input data rate is 3 Mbps maximum. Video data may be stored in a dedicated video 2 Mbyte SDRAM. Audio, PSI and generic PES data may be stored in the system memory. Therefore, the back-end of the transport demultiplex interfaces to the memory arbiter that controls the system memory. The system memory interface is an 81 MHz 32-bit bus for example.

In one embodiment, the single chip set-top box system includes a data transport processor that is an MPEG-2 transport stream message/PES parser and demultiplexer capable of processing two independent serial transport streams simultaneously. The processor supports decryption for up to 44 PIDs in the in-band stream for example. The processor supports 32 PIDs for PSI message or PES processing and it supports 32 PSI section filters or filters for processing of MPEG or DVB sections. In one embodiment, it includes a special addressing mode that filters MPEG and private stream messages. The messages are preferably stored in one of 32 circular message buffers that reside in external memory.

The data transport module supports two simultaneous input channels, typically allocated to the in-band and out-of bandstreams, respectively. There are two input synchronizers that synchronize incoming serial MPEG transport packets to the module's processing clock. The data is then converted to bytewide format.

The transport module supports a DVB and DES descrambler for up to 44 PIDs in the in-band transport stream including video, audio and data streams. The DVB engine supports full and conformance mode. The DES engine supports ECB and CBC mode with selectable residue termination modes of partial block unscrambled, residual block termination and cipher-text stealing. There is a mode for the processor to use the DES engine to encrypt or decrypt 64 bits of data during transport stream decryption. The microprocessor is preferably guaranteed a result in ninety-four 81 MHz clock cycles.

The illustrated embodiment includes two independent PID filters. A 44 entry PID table is used to compare with PIDs of the transport streams. Each PID filter examines its corresponding transport stream for the PIDs that it is programmed to accept. Each of the 44 PIDs may be arbitrarily allocated between the two input channels. The output of the PID filters form 44 PID channels of transport packet data, each corresponding to a PID table entry. Data from up to 32 PID channels (0-31), after further processing, are sent to one of 32 DRAM buffers. For out-of-band transport stream only, the same PID may be selected for different PID channels, allowing different PSI section filter output of the same PID stream to be sent to different memory buffers. Common PIDs between the two streams are processed as two independent PIDs. The PID filter examines the continuity counter and rejects duplicate packets. It generates error interrupts for length errors and discontinuity errors.

The same PID may be assigned to more than one PID channel (referred to as duplicate PID assignments). This feature may be used to provide different PSI or PES filtering options for messages within a common PID stream. There may be constraints to follow when utilizing duplicate PID assignments. For any single PLD channel, only 1 type of packet filtering option is allowed. For out-of-band transport streams, the same PID can be selected for different PID channels, enabling different PSI section filter output of the same PID stream to be sent to different memory buffers. For duplicate PIDs, if one channel is programmed for all-pass, then the rest of the channels with the same PID will also be treated as if they were programmed for all-pass. This is true even if the other duplicate PID channels are not programmed for PES, PSI or all-pass. For MPEG, since either PES packets or PSI messages (but not both) are contained in a single PID, there should never be duplicate PIDs with mixture of both PES and PSI filtering enabled. When duplicate PID assignments are created which cause a single message to be stored to more than one memory buffer, the total data throughput of the transport processor is reduced.

The data transport module includes a packet input buffer that holds all accepted transport packets and presents them in turn to subsequent processing blocks. The maximum processing rate of the selected transport packets is 81 Mbps in one embodiment. Packets not selected by the PID filters are not stored.

The data transport module includes a PES parser that delineates PES packets and sends them to the memory buffers. Any number of up to 32 accepted PID channels (0-31) can be processed. When a complete PES packet is received, a data available interrupt is generated by the data buffer manager. The PES parser checks for PES packet lengths and generates length error interrupts. PES Padding streams are preferably removed by default, or optionally retained. During record, padding bytes (0x55) are added at the end of each PES packet to word align to 32-bit boundaries in the memory buffers.

The PES parser uses a payload unit start indicator bit in the transport packet. A length error is generated whenever the end of a PES packet does not coincide with the end of a transport packet or the payload unit start indicator is received prior to the end of the current PES packet.

The data module includes a PSI filter that delineates PSI sections and performs byte-compare filtering, special addressing mode filtering, and CRC checking. For byte-compare filtering, there are 32, 13-byte filters, for example with corresponding bit masks, to compare with section bytes 0-13, excluding byte 2 i.e. length LSB) for example. Each accepted PID may select any number of the 32 filters, the filters being reusable by up to 32 PID channels (0-31).

The special addressing mode filter examines the PSI section header syntax, and filters on address compares with the special mode addresses for PID channels 0-31. There may be one 40 bit physical address and one multicast 24 bit address for example. There may be two 40 bit network addresses and two multicast 40 bit addresses, one for each input channel for example. The network addresses and multicast 40 bit addresses each support a wildcard of 4 or 8 bits. In addition, each PID has 4 multicast 16 bit addresses for example. The filter also compares the table ID with a set of lower and upper table ID limits and reject the sections that fall within these limits. Each of these addressing modes may be enabled on a per PID basis for PID channels 0-31.

In one embodiment the PSI filter verifies section starts, removes padding bytes, and performs CRC checks. If a CRC check fails, the packet is rejected. Instead of outputting the CRC bytes with the section data, optionally a sentinel may be output. This option may be enabled on a per PID basis. Messages that are less than 7 or greater than 4096 for example are rejected.

The data transport module includes a memory buffer manager that collects all accepted data and sends it to 1 of 32 corresponding memory buffers. The output of each PID channel (0-31) is assigned a different memory buffer. Each memory buffer can start on any I Kbyte address boundary, and may be from 1 Kbyte to 128 Kbytes long for example. The memory buffer manager maintains a pointer to the last valid memory location of each buffer, and the last read memory location supplied by the control processor. If unread data is present, an interrupt is generated. The memory buffer manager will wait until the entire delineated massage (PES packet, PSI section, etc.) is verified and written to memory before it updates the valid memory pointer. In one embodiment, each message is 32 bit word aligned. A partial word at the end of a message is filled with bytes of 0x55. Message bytes are positioned in each 32-bit word starting with the MSbyte.

The data transport module includes an interrupt controller that generates one interrupt for any of the data available or error conditions. Each of these conditions are maskable. The interrupt status registers may be read to determine the conditions, and written to clear the interrupts. Status and error condition as are indicated on a per PID basis.

The transport module supports a 115 Mbps throughput data rate of accepted packets, sustained. Input burst rate may be higher. In one embodiment, packets rejected by the PID parsers are not processed. If out-of-band PID channels are duplicated to use multiple buffers, and as a result duplicated data is accepted, it may consume more of the throughput data rate. If the data rate for the accepted packets, plus duplications, are higher than 115 Mbps, the input packet buffer may overflow. The buffer overflow condition generates an error interrupt.

The system includes a linked-listed DMA function for use in conjunction with the transport function. The DMA supports efficient transfer of arbitrary numbers of messages from message buffers to arbitrary addresses in the system DRAM.

The single chip set-top box system may in one embodiment, include a Dolby Digital, MPEG, audio, transport and decompression processor, which may also be referred to as a Musicam and Dolby Digital audio decoder. The Musicam and Dolby Digital audio decoder may be implemented as several discrete processing functions or as a single integrated block. Data is first processed by an audio transport and interface processors, which handle synchronization and filtering functions. Next, data preferably is sent to the Dolby Digital and MPEG audio decompression processor for conversion from compressed audio data to uncompressed PCM audio data. The output PCM audio data may be mixed with PCM audio from a playback memory interface. The final mixed audio may be output either digitally over an SPDIF interface or in analog mode through a two-channel audio DAC.

The audio transport module may include two sub-modules; an audio packet demultiplexer and an audio interface module. The audio packet demultiplexer may receive transport packets in MPEG format. Additionally, audio packet demultiplexer may receive PES packets in MPEG format. This module may process the transport header when it is present. Filtering may be done on the PID (MPEG) to select the desired audio program. The continuity count for the selected program may be checked and used to detect and initiate recovery from a single missing transport packet. If more than one transport packet is detected as missing, a signal may be sent to the audio interface module instructing it to abort processing and restart.

The audio packet demultiplexer may extract PTS values from PES packets when instructed to search for a new PTS by the audio interface module. When the audio packet demultiplexer is receiving PES packets, filtering may be done on the stream ID. The audio packet demultiplexer may handle splicing of audio services for functions such as commercial insertion. It may also be responsible for providing a local PCR (STC) to the audio interface module. In one embodiment, the PCR preferably is extracted from an MPEG transport stream (the PID can be different than the audio PID). The audio packet demultiplexer outputs elementary stream (ES) to the audio interface module.

In one embodiment the audio interface module is responsible for detection and tracking of Dolby Digital, MPEG (Layer I and II) audio sync frames. The audio interface module may contain a state machine that synchronizes audio delivery to an audio processor based on PTS, PCR and a programmable offset. The audio interface module detects and processes various audio frame errors which may be reported to the system processor via an interrupt (individual source maskable) and a register. The audio interface module maintains the audio FIFO in the system DRAM and preferably delivers serialized audio data to the audio decompression processor. The serial output may be halted when the audio decompression processor indicates it cannot receive any more data or when a time-stamped audio frame is being held until its presentation time.

For a pleasant viewing experience, the presentation of audio and video should be matched to acceptable limits. Recommendation ITU-R BT.1359-1 defines the acceptable region as being from 90 msec early to 185 msec late when audio is measured relative to video. Thus large offsets are typically less noticeable if audio lags video. In one embodiment of the present invention, audio delays may be adjusted so as to achieve lip syncing.

A 3-D audio engine may in one embodiment, interface to the serial output of the audio decompression processor and may perform 3-D audio enhancement signal processing, conforming to the SRS Labs, Inc., TruSurround™ and SRS algorithms. The 3-D audio engine may perform its signal processing in the digital domain, and may act as a co-processor in a digital audio subsystem. The 3-D audio engine may be bypassed, under microprocessor control, for application not requiring 3-D audio. An audio sigma-delta modulator may interface with the serial output of the 3-D audio engine and may perform one or more functions necessary to produce an analog output signal. The output of the audio sigma-delta modulator may be a pair of differential pulse density outputs for left and right channels. These signals may be low-pass filtered externally to recover the audio signal.

In many embodiments such as web browsing or computer generated graphics, for example the graphical content is coded with square aspect ratio pixel sampling (for example 640×480 resolution) while the standard for digital video (ITU-R BT.601) specifies a pixel aspect ratio that is rectangular. Unlike other solutions that are designed for all content being in only one pixel aspect ratio or the other, the graphics processor in one embodiment of the present invention is capable of optionally adjusting the pixel aspect ratio of the graphics to match that of the video, without affecting the video and with no significant loss of quality to the graphics. Further, the pixel aspect ratio scaling in the graphics processor operates in such a way as to optimally match the graphics size to the displayable size of normal television. It may also support display of the same graphical content on both NTSC and PAL/SECAM televisions, without modifying the graphics imagery.

The pixel aspect ratio matching function and the anti-flutter filter may be integrated into one optimized multi-tap polyphase vertical filter and sample rate converter, for maximum quality and minimum hardware complexity. As with the anti-flutter filter, the pixel aspect ratio matching function may not have affect on either the full-screen or scaled live video, even though there may be a large number of graphics surface composited anywhere on the screen with aspect ratio correction.

One embodiment of a set top box 1700 is illustrated in FIG. 17 similar to that illustrated in FIG. 2. The illustrated transceiver 1702 includes an out of band block 1702A coupled to the DAVIC MAC 1706, where DAVIC format data 1712 is communicated to the DAVIC MAC 1706 and Data 1714 is received by the upstream transmitter. Out of Band and In Band blocks 1702B and 1702C respectively communicate with transport processor 1708, which can also receive MPEG data from the DAVIC MAC 1706. Additionally, the Out of Band and In Band blocks 1702D and 1702C communicate with access control device 1710, which is described in greater detail below with respect to FIG. 21. In Band and Out of Band blocks 1710A and 1710B of the access device 1710 are coupled to transport processor 1708.

Figure 18:
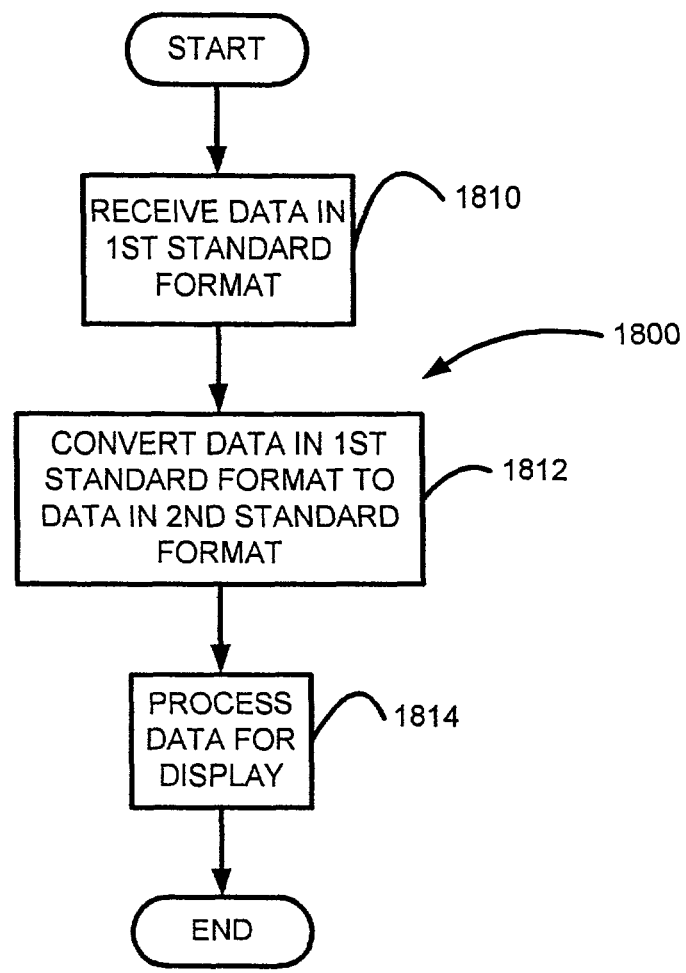
FIG. 18 illustrates a flow chart for converting data and processing the data for display using a set-top box according to one embodiment of the present invention.

A method 1800 of performing multiple functions on data using a single chip set-top system in accordance with one embodiment of the present invention is illustrated in FIG. 18. The method 1800 acquires or receives the data in a first standard format and converts the data in the first standard format to data in a second standard format as illustrated by blocks 1810 and 1812. In one embodiment, the first standard format includes messaging, MPEG, DAVIC, MPEG layered on DAVIC or IP Stacks, for example, while converting the data from the first standard format to the second standard format includes splitting the MPEG from DAVIC for example.

Method 1800 processes the data in the second standard format for display as indicated by block 1814. Processing the data includes, in one embodiment, decrypting the data, decoding the data, mixing the data or encoding the data. Processing the data includes, without limitation, communicating the data to a display device.

Figure 19:
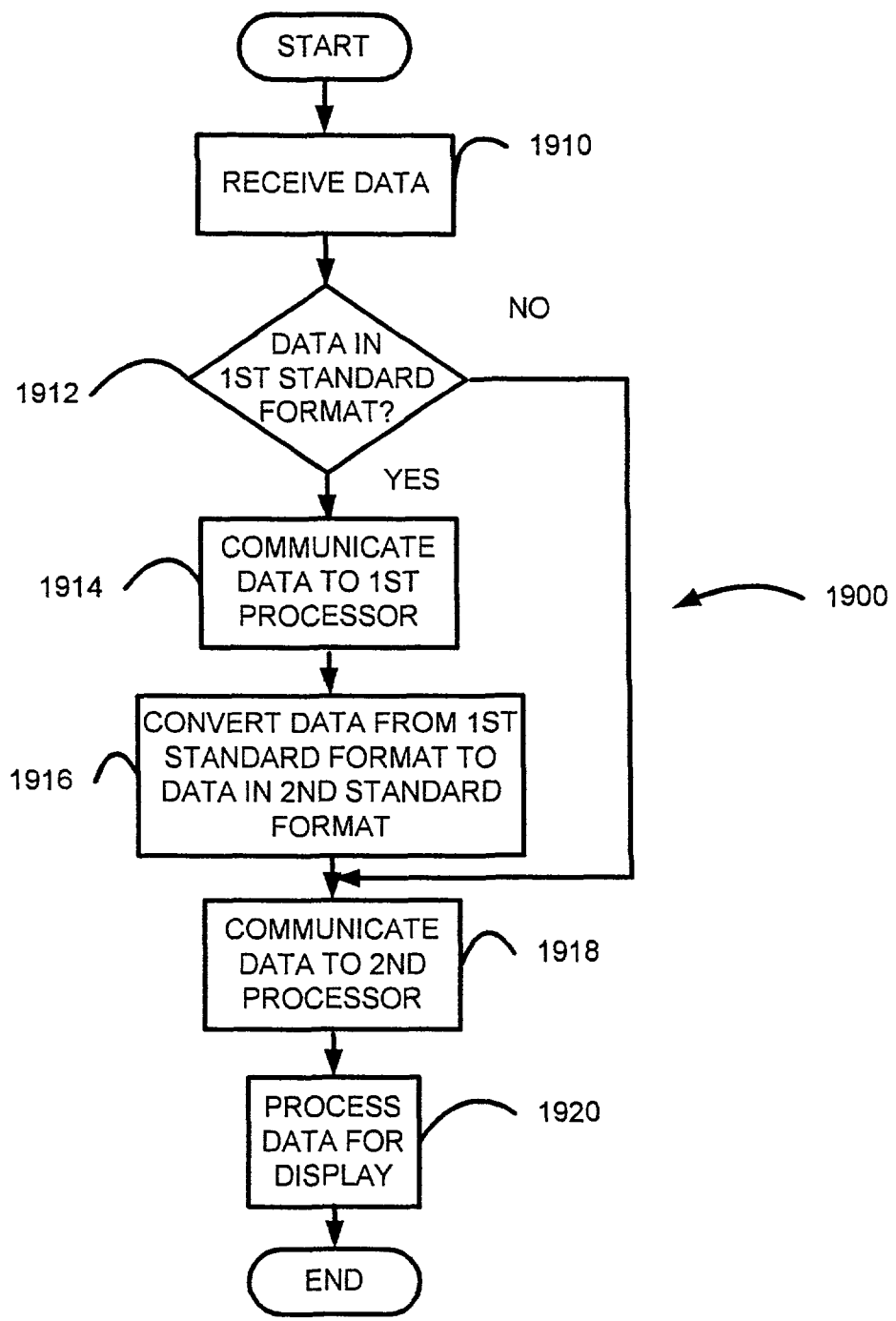
FIG. 19 illustrates a flow chart for determining if data for display is in a first or second format using a set-top box according to one embodiment of the present invention.

FIG. 19 illustrates a method, generally designated 1900, of processing data for display. Method 1900 includes receiving or acquiring the data as illustrated by block 1910. The method determines if the data is in a first or second standard format as illustrated by diamond 1912. In one embodiment, determining if the data is in a first or a second format includes determining if the data is DAVIC, for example. If the data is determined to be in a first standard format, it is communicated to a first processor as illustrated by block 1914. In one embodiment, this includes communicating the data to a DAVIC MAC, for example.

The illustrated method includes converting the data in the first standard format to data in a second standard format as illustrated by block 1916. This may include converting data from DAVIC to MPEG, for example. It should be appreciated that, If the data is not in the first standard format but is in the second standard format as illustrated by block 1912, the process moves to block 1918. The data in the second standard format is communicated to a second processor, a transport processor for encryption or decryption for example, as illustrated by block 1918. The data is processed for display as illustrated by block 1920. In one embodiment, processing the data includes decoding the data in the second format, encoding for hard disk drive storage, for example, or decoding MPEG, for example.

Figure 20:
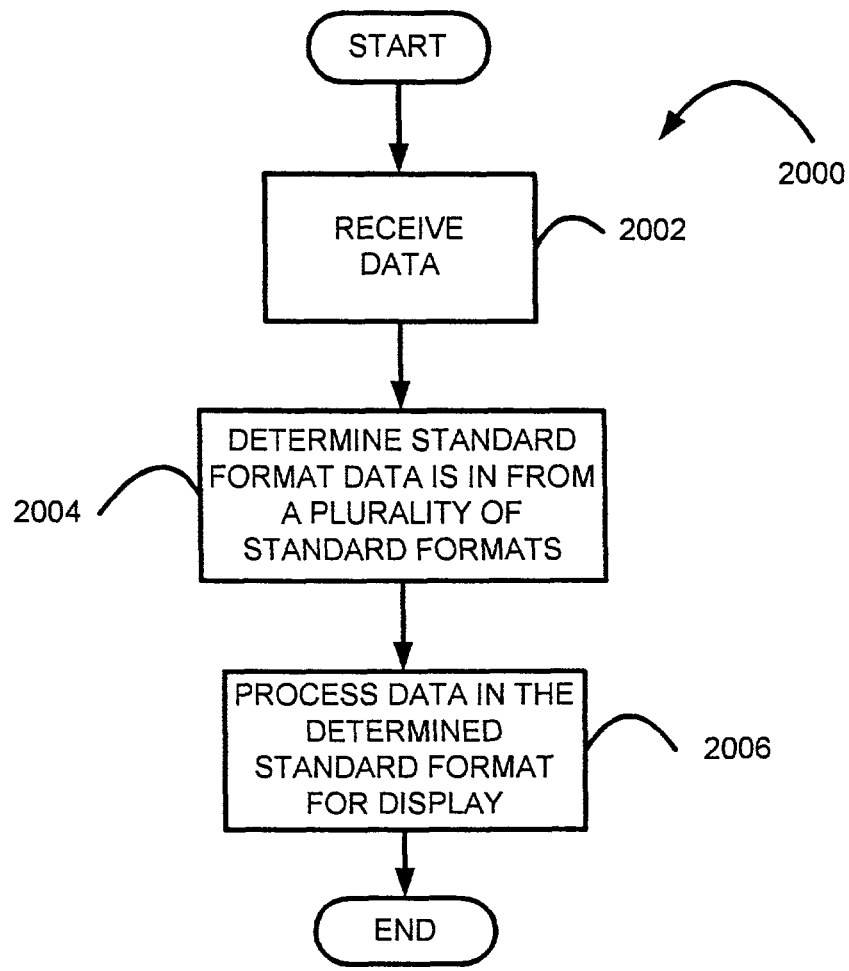
FIG. 20 illustrates a flow chart for determining the standard format the data is in using a set-top box according to one embodiment of the present invention.

FIG. 20 illustrates a method, generally designated 2000, for determining the standard format the data is in. In one embodiment this method 2000 includes determining the standard format the data is in using a set-top box prior to displaying the data. The data is received or acquired as illustrated by block 2002. In one embodiment, a plurality of standard formats are contemplated. The standard format of the data is determined from the plurality of formats as illustrated by block 2004. The data in the determined standard format is processed for display as illustrated in block 2006.

Figure 21:
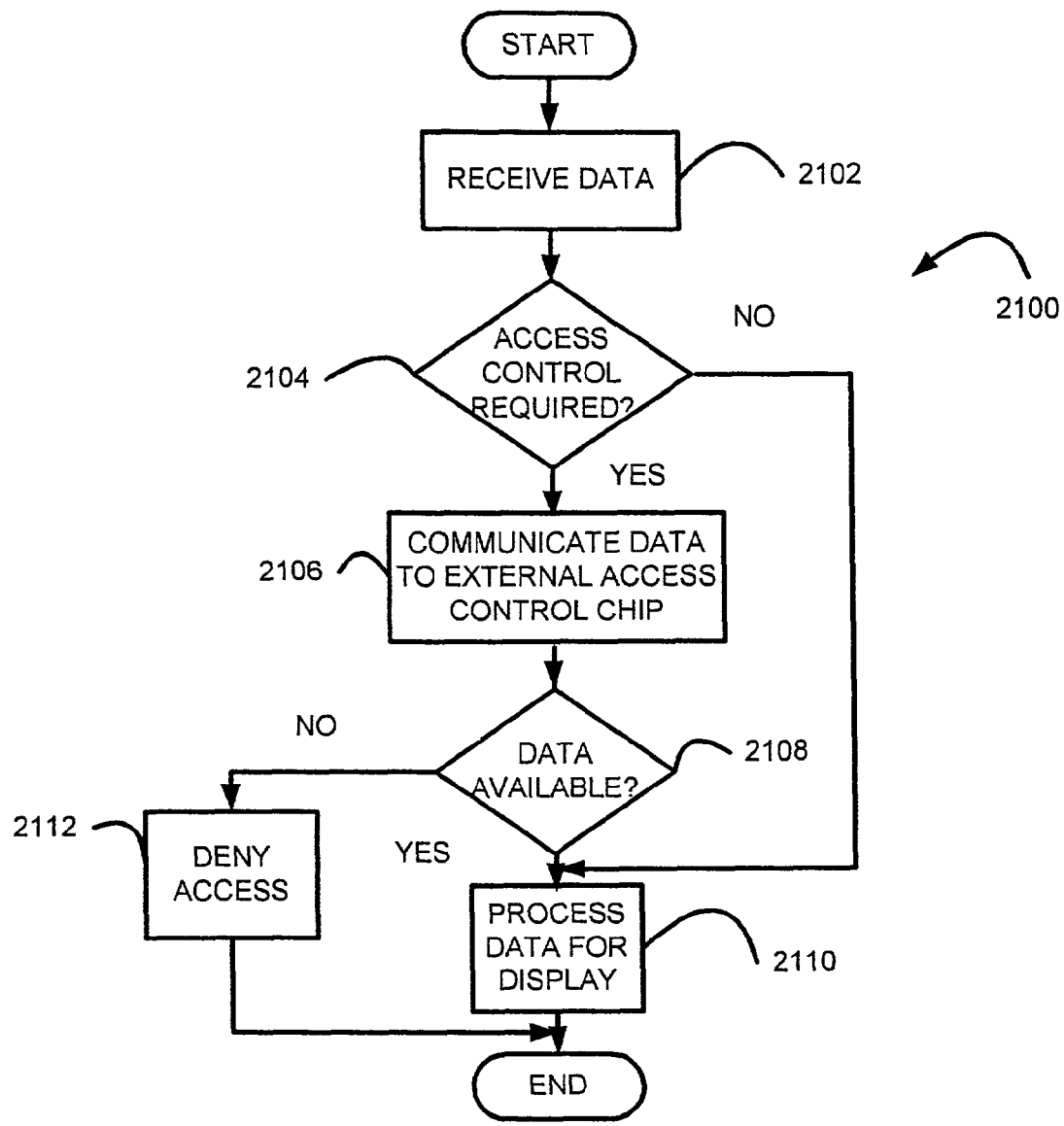
FIG. 21 illustrates a flow chart for determining if access control is required prior to processing data for display using a set-top box according to one embodiment of the present invention.

FIG. 21 illustrates a method, generally designated 2100, for determining if access control is required prior to processing data for display using a set-top box in accordance with one embodiment of the present invention. Method 2100 comprises receiving or acquiring data as illustrated by block 2102. The method then determines if the access control is required as illustrated by diamond 2104. If access control is required, the data, or at least a request for authorization, is communicated to an external access control chip as illustrated by block 2106. If access is not required, the data is processed for display as illustrated by block 2110, and then displayed.

If the data (or at least the request for authorization) is communicated to the external access control chip, the method determines if authorization or copy protection data is available, as illustrated by diamond 2108. For example, the access control chip makes a determination of whether the data is authorized to be viewed. If the authorization or copy protection data is not available (or available, as the case may be), access to the data desired to be viewed is denied (or permitted), as illustrated by block 2112. If the authorization or copy protection data is available (or not available, as the case may be), the access control chip communicates (or does not communicate, as the case may be) the data for display (or at least an indication that viewing is authorized or not authorized, as the case may be), and the data is processed for display as illustrated by block 2110, and then displayed.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A single chip set-top box system comprising:
   a transceiver operable to receive a digitally modulated compressed video signal from an in-band media stream and to demodulate the digitally modulated compressed video signal to generate a compressed video signal, wherein the compressed video signal carries a plurality of programs;
   the transceiver further operable to receive an out-of-band media stream comprising graphics;
   a transport processor operable to receive the compressed video signal and the graphics from the transceiver, wherein the transport processor comprises a filter configured to filter a portion of the compressed video signal corresponding to a particular one of the plurality of programs;
   a video decoder operable to receive the portion of the compressed video signal from the transport processor and to decompress the portion of the compressed video signal;
   a graphics processor operable to blend the decompressed portion of the video signal from the in-band media stream with the graphics from the out-of-band media stream to generate a blended video image, the graphics processor further being configured to adjust a pixel aspect ratio of the graphics to match a pixel aspect ratio of the video signal without affecting the pixel aspect ratio of the video signal; and
   an analog video decoder operable to receive an analog video signal, to digitize the analog video signal, and to transmit the digitized analog video signal to the graphics processor to be blended with the decompressed portion of the video signal and the graphics,
   wherein the transceiver, the transport processor, the video decoder, the graphics processor, and the analog video decoder are integrated on a single integrated circuit chip.

2. The single chip set-top box system according to claim 1 further comprising a DAVIC MAC, wherein the transceiver receives out-of-band data from the out-of-band media stream and provides the out-of-band data to the DAVIC MAC.

3. The single chip set-top box system according to claim 1 further comprising a central processing unit (CPU) operable to coordinate interfaces and activities of the transceiver, the video decoder, and the graphics processor, and wherein the filter filters the portion of the video signal corresponding to the particular one of the plurality of programs by examining program identifiers (PID).

4. The single chip set-top box system according to claim 1 further comprising a memory controller operable to control memory access of the transceiver, the video decoder, and the graphics processor in a unified memory system.

5. The single chip set-top box system according to claim 1 further comprising a video encoder operable to receive the blended video image from the graphics processor and to format the blended video image for display on a display device.

6. A multi-media system comprising:
   a single integrated circuit comprising:
   a transceiver operable to receive a digitally modulated compressed video signal from an in-band media stream and to demodulate the digitally modulated compressed video signal to generate a compressed video signal;
   the transceiver further operable to receive an out-of-band media stream comprising graphics;
   a video decoder operable to receive the compressed video signal from the transceiver and to decompress the compressed video signal;
   a graphics processor operable to blend the graphics with the video signal, wherein the graphics processor is configured to adjust a pixel aspect ratio of the graphics from the out-of-band media stream to match a pixel aspect ratio of the video signal from the in-band media stream without affecting the pixel aspect ratio of the video signal;
   a memory controller operable to arbitrate memory accesses of the transceiver, the video decoder, and the graphics processor to an off-chip shared single module memory;
   a processor operable to coordinate interfaces and activities of the transceiver, the video decoder, and the graphics processor; and
   an analog video decoder operable to receive an analog video signal, to digitize the analog video signal, and to transmit the digitized analog video signal to the graphics processor to be blended with the decompressed video signal and the graphics.

7. The multi-media system of claim 6, wherein the transceiver comprises a wireless transceiver.

8. The multi-media system of claim 6, wherein the transceiver comprises an ITU-T J.83 transceiver.

9. The multi-media system of claim 6, wherein the transceiver comprises a QAM receiver operable to receive the in-band media stream.

10. The multi-media system of claim 6, wherein the transceiver comprises a QPSK receiver operable to receive the out-of-band media stream.

11. The multi-media system of claim 6, wherein the transceiver comprises a QPSK/16-QAM transmitter.

12. The multi-media system of claim 6, wherein the processor comprises a central processing unit.

13. The multi-media system of claim 12, wherein the central processing unit comprises a MIPS.

14. The multi-media system of claim 6, wherein the single integrated circuit further comprises a MAC.

15. The multi-media system of claim 6, wherein the single integrated circuit further comprises an encoder that encodes at least one of audio and video, and wherein the memory controller arbitrates accesses of the encoder to the shared single module memory.

16. The multi-media system of claim 6, wherein the graphics of the out-of-band media stream are alpha blended with the decompressed video signal of the in-band media stream and an audio signal to generate a blended video image with sound.

17. The multi-media system of claim 6, wherein the compressed video signal is compressed in accordance with an MPEG standard.

18. The multi-media system of claim 17, wherein the MPEG standard comprises MPEG-1.

19. The multi-media system of claim 17, wherein the MPEG standard comprises MPEG-2.

20. The multi-media system of claim 17, wherein the MPEG standard comprises MPEG-4.

21. The multi-media system of claim 6, wherein the single integrated circuit further comprises a video encoder operable to receive a blended video image from the graphics processor and to format a blended video image for display on a display device, and wherein the memory controller also arbitrates accesses by the video encoder to the shared single module memory.

22. The multi-media system of claim 6, wherein the memory controller also arbitrates accesses by the analog video decoder to the shared single module memory.

23. The multi-media system of claim 6, wherein the single integrated circuit further comprises peripheral interfaces for user control of the multi-media system, and wherein the memory controller also arbitrates access by the peripheral interfaces to the shared single module memory.

24. The multi-media system of claim 6, further comprising the shared single module memory configured to store information during at least one of audio, video, data, or graphics processing.

25. The multi-media system of claim 6, wherein the single integrated circuit comprises at least one cache memory for storing instructions for execution by the processor.

26. The multi-media system of claim 25, wherein the processor comprises the at least one cache memory.

27. The multi-media system of claim 6, wherein the single integrated circuit comprises memory configured to be a buffer for system memory.

28. The multi-media system of claim 6, wherein the video decoder further comprises an audio decoder.

29. The multi-media system of claim 28, wherein the audio decoder is implemented as a plurality of hard-wired processing functions.

30. The multi-media system of claim 28, wherein the audio decoder is implemented as firmware.

31. The multi-media system of claim 30, wherein the audio decoder comprises a programmable ASIC.

32. The multi-media system of claim 28, wherein the audio decoder is implemented as software.

33. The multi-media system of claim 32, wherein the audio decoder is programmed in the processor.

34. The multi-media system of claim 28, wherein the audio decoder comprises an audio decompression processor.

35. The multi-media system of claim 34, wherein the audio decompression processor comprises a plurality of modules.

36. The multi-media system of claim 6, wherein the graphics processor is implemented in hardware.

37. The multi-media system of claim 6, wherein the graphics processor is implemented in firmware.

38. The multi-media system of claim 37, wherein the graphics processor comprises a programmable ASIC.

39. The multi-media system of claim 6, wherein the graphics processor is implemented as software.

40. The multi-media system of claim 6, wherein the graphics processor is implemented as at least two of hardware, firmware, or software.

41. The multi-media system of claim 6, wherein the memory controller supplies data to an upstream transmitter, and also arbitrates a request for said data from the shared single module memory.

42. The multi-media system of claim 41, wherein the memory controller supplies the data from a memory on the single integrated circuit.

43. The multi-media system of claim 42, wherein the data is stored in the memory by the processor.

44. The multi-media system of claim 6, wherein the single integrated circuit further comprises a DAVIC MAC.

45. The multi-media system of claim 44, wherein the DAVIC MAC supplies an upstream transmitter with serialized data from the shared single module memory to the single integrated circuit, and wherein the memory controller also arbitrates accesses by the DAVIC MAC to the shared single module memory.

46. The multi-media system of claim 6, wherein the memory controller supports message transfer from at least one buffer to the shared single module memory.

47. The multi-media system of claim 6, wherein the memory controller supports message transfer from a plurality of message buffers.

48. The multi-media system of claim 6, wherein the memory controller supports message transfer to a unified system memory external to the single integrated circuit.

49. A multi-media system comprising:
a transceiver operable to receive a digitally modulated compressed video signal from an in-band media stream and to demodulate the digitally modulated compressed video signal to generate a compressed video signal;
the transceiver further operable to receive an out-of-band media stream comprising graphics;
a video decoder operable to receive the compressed video signal from the transceiver and to decompress the compressed video signal;
a graphics processor operable to blend the graphics with the video signal, wherein the graphics processor is configured to adjust a pixel aspect ratio of the graphics to match a pixel aspect ratio of the video signal without affecting the pixel aspect ratio of the video signal;
an analog video decoder operable to receive an analog video signal, to digitize the analog video signal, and to transmit the digitized analog video signal to the graphics processor to be alpha blended with the decompressed video signal and the graphics;

a processor that at least assists in coordination of operation of the transceiver, the video decoder, and the graphics processor, wherein said transceiver, said video decoder, said graphics processor, said processor, and said analog video decoder are all integrated on a single chip; and a memory controller operable to control accesses by an audio decoder, the video decoder, and the graphics processor to an off-chip shared single module memory.

50. The multi-media system of claim 49, wherein the transceiver comprises a wireless transceiver.

51. The multi-media system of claim 49, wherein the transceiver comprises an ITU-T J.83 transceiver.

52. The multi-media system of claim 49, wherein the transceiver comprises a QAM receiver operable to receive the in-band media stream comprising the video signal.

53. The multi-media system of claim 49, wherein the transceiver comprises a QPSK receiver operable to receive the out-of-band media stream comprising the graphics.

54. The multi-media system of claim 49, wherein the transceiver comprises a QPSK/16-QAM transmitter.

55. The multi-media system of claim 49, wherein the processor comprises a central processing unit.

56. The multi-media system of claim 55, wherein the central processing unit comprises a MIPS.

57. The multi-media system of claim 49 further comprising a MAC integrated on the single chip.

58. The multi-media system of claim 49, further comprising an encoder integrated on the single chip, and wherein the encoder encodes at least one of audio or video, and wherein the memory controller also arbitrates access to the shared single module memory by the encoder.

59. The multi-media system of claim 49, wherein the graphics are blended with the decompressed video signal and an audio signal to generate a blended video image with sound.

60. The multi-media system of claim 49, wherein the compressed video signal is compressed in accordance with an MPEG standard.

61. The multi-media system of claim 60, wherein the MPEG standard comprises MPEG-1.

62. The multi-media system of claim 60, wherein the MPEG standard comprises MPEG-2.

63. The multi-media system of claim 60, wherein the MPEG standard comprises MPEG-4.

64. The multi-media system of claim 49 further comprising a video encoder integrated on the single chip, and wherein the video encoder receives a blended video image from the graphics processor and formats a blended video image for display on a display device, and wherein the memory controller arbitrates access to the shared single module memory by the video encoder.

65. The multi-media system of claim 49, wherein the memory controller arbitrates access to the shared single module memory by the analog video decoder.

66. The multi-media system of claim 49 further comprising peripheral interfaces integrated on the single chip, and wherein the peripheral interfaces provide for user control of the multi-media system.

67. The multi-media system of claim 49 further comprising system memory external to the single chip and configured to store information during at least one of audio, video, data, or graphics processing.

68. The multi-media system of claim 49 comprising at least one cache memory integrated on the single chip.

69. The multi-media system of claim 68, wherein the processor comprises the cache memory.

70. The multi-media system of claim 67 comprising memory integrated on the single chip and configured to be a buffer for the system memory.

71. The multi-media system of claim 49, wherein the video decoder further comprises an audio decoder.

72. The multi-media system of claim 71, wherein the audio decoder is implemented as a plurality of hard-wired processing functions.

73. The multi-media system of claim 71, wherein the audio decoder is implemented as firmware.

74. The multi-media system of claim 73, wherein the audio decoder comprises a programmable ASIC.

75. The multi-media system of claim 71, wherein the audio decoder is implemented as software.

76. The multi-media system of claim 75, wherein the audio decoder is programmed in the processor.

77. The multi-media system of claim 71, wherein the audio decoder comprises an audio decompression processor.

78. The multi-media system of claim 77, wherein the audio decompression processor comprises a plurality of modules.

79. The multi-media system of claim 49, wherein the graphics processor is implemented in hardware.

80. The multi-media system of claim 49, wherein the graphics processor is implemented in firmware.

81. The multi-media system of claim 80, wherein the graphics processor comprises a programmable ASIC.

82. The multi-media system of claim 49, wherein the graphics processor is implemented as software.

83. The multi-media system of claim 49, wherein the graphics processor is implemented as at least two of hardware, firmware, or software.

84. The multi-media system of claim 49, wherein the memory controller supplies data to an upstream transmitter, and also arbitrates access to the data from the shared single module memory by the upstream transmitter.

85. The multi-media system of claim 49, wherein the single chip further comprises a DAVIC MAC, and wherein the memory controller also arbitrates accesses to the shared single module memory by the DAVIC MAC.

86. The multi-media system of claim 85, wherein the DAVIC MAC supplies an upstream transmitter with serialized data from a system memory external to the single chip.

87. The multi-media system of claim 84, wherein the memory controller supports message transfer from at least one buffer to memory.

88. The multi-media system of claim 84, wherein the memory controller supports message transfer from a plurality of message buffers.

89. The multi-media system of claim 84, wherein the memory controller supports message transfer to a system memory external to the single chip.

* * * * *